(12) United States Patent
Morvillo

(10) Patent No.: US 11,148,779 B2
(45) Date of Patent: Oct. 19, 2021

(54) SYSTEM FOR CONTROLLING MARINE CRAFT WITH STEERABLE DRIVES

(71) Applicant: Robert A. Morvillo, Dover, MA (US)

(72) Inventor: Robert A. Morvillo, Dover, MA (US)

(*) Notice: Subject to any disclaimer, the term of this patent is extended or adjusted under 35 U.S.C. 154(b) by 0 days.

(21) Appl. No.: 16/460,326

(22) Filed: Jul. 2, 2019

(65) Prior Publication Data
US 2020/0001961 A1 Jan. 2, 2020

Related U.S. Application Data

(62) Division of application No. 14/850,939, filed on Sep. 10, 2015, now Pat. No. 10,370,078.

(60) Provisional application No. 62/048,792, filed on Sep. 10, 2014.

(51) Int. Cl.
B63H 25/42 (2006.01)
B60W 10/20 (2006.01)
B62D 6/00 (2006.01)
B63H 20/08 (2006.01)
B63B 79/10 (2020.01)
B63B 79/20 (2020.01)
B63B 79/40 (2020.01)
B63H 20/00 (2006.01)
B63H 25/02 (2006.01)

(52) U.S. Cl.
CPC ............ B63H 25/42 (2013.01); B60W 10/20 (2013.01); B62D 6/002 (2013.01); B63B 79/10 (2020.01); B63B 79/20 (2020.01); B63B 79/40 (2020.01); B63H 20/08 (2013.01); B60W 2510/20 (2013.01); B60W 2540/18 (2013.01); B60W 2710/20 (2013.01); B63H 2020/003 (2013.01); B63H 2025/026 (2013.01)

(58) Field of Classification Search
CPC .. B63H 25/42; B63H 20/08; B63H 2020/003; B63H 2025/026; B62D 6/002; B60W 10/20; B60W 2710/20; B60W 2510/20; B60W 2540/18; B63B 79/00; B63B 79/10; B63B 79/40; B63B 79/20
See application file for complete search history.

(56) References Cited

U.S. PATENT DOCUMENTS 2,968,192 A    1/1961 Fletcher et al.
2,999,476 A    9/1961 Verne
4,778,418 A   10/1988 Mondek
4,981,452 A *  1/1991 Grinde ................. B63H 5/1252
                                                 440/53

(Continued)

OTHER PUBLICATIONS

International Preliminary Report on Patentability for International Application No. PCT/US2011/052851 dated Apr. 4, 2013.

(Continued)

Primary Examiner — Jason Holloway
(74) Attorney, Agent, or Firm — Wolf, Greenfield & Sacks, P.C.

(57) ABSTRACT

A system for controlling one or more propulsion devices of a marine vessel. The system includes circuitry configured to: receive a steering angle command for a propulsion device of the marine vessel; receive a trim position of the propulsion device; and generate a steering actuator position command for the propulsion device based on the steering angle command and the trim position of the propulsion device.

10 Claims, 25 Drawing Sheets

(56) References Cited

U.S. PATENT DOCUMENTS

| | | | |
|---|---|---|---|
| 6,179,673 B1 | 1/2001 | Leroux | |
| 6,561,860 B2 | 5/2003 | Colyvas | |
| 7,037,150 B2 | 5/2006 | Morvillo | |
| 7,052,338 B2 | 5/2006 | Morvillo | |
| 7,128,626 B2 | 10/2006 | Dudra et al. | |
| 7,143,363 B1 | 11/2006 | Gaynor et al. | |
| 7,216,599 B2 | 5/2007 | Morvillo | |
| 7,222,577 B2 | 5/2007 | Morvillo | |
| 7,267,588 B1 | 9/2007 | Griffiths et al. | |
| 7,311,572 B2 | 12/2007 | Yamashita et al. | |
| 7,467,595 B1 | 12/2008 | Lanyi et al. | |
| 7,500,890 B2 | 3/2009 | Morvillo | |
| 7,527,537 B2 | 5/2009 | Mizutani | |
| 7,601,040 B2 | 10/2009 | Morvillo | |
| 7,641,525 B2 | 1/2010 | Morvillo | |
| 7,972,187 B2 | 7/2011 | Morvillo | |
| 8,126,602 B2 | 2/2012 | Morvillo | |
| 8,376,791 B2 | 2/2013 | Chiecchi | |
| 9,926,060 B1* | 3/2018 | Wiatrowski | B63H 5/125 |
| 10,011,339 B2* | 7/2018 | Anschuetz | B63H 20/10 |
| 10,370,078 B2 | 8/2019 | Morvillo | |
| 2002/0086594 A1 | 7/2002 | Colyvas | |
| 2004/0005824 A1 | 1/2004 | Zeiger | |
| 2005/0070180 A1* | 3/2005 | von Wolske | B63H 5/00 440/55 |
| 2005/0164569 A1 | 7/2005 | Kaji et al. | |
| 2005/0272322 A1 | 12/2005 | Mizuguchi et al. | |
| 2005/0282448 A1 | 12/2005 | Tawa et al. | |
| 2007/0017426 A1* | 1/2007 | Kaji | G05D 1/0208 114/144 RE |
| 2007/0093147 A1 | 4/2007 | Mizutani | |
| 2008/0026655 A1 | 1/2008 | Gai et al. | |
| 2008/0299846 A1 | 12/2008 | Torrangs et al. | |
| 2008/0318482 A1 | 12/2008 | Torrangs et al. | |
| 2010/0022146 A1 | 1/2010 | Morvillo | |
| 2010/0191396 A1 | 7/2010 | Nose et al. | |
| 2010/0304627 A1 | 12/2010 | Morvillo | |
| 2010/0305789 A1 | 12/2010 | Ito | |
| 2011/0166724 A1 | 7/2011 | Hiramatsu | |
| 2016/0068247 A1 | 3/2016 | Morvillo | |
| 2018/0050781 A1* | 2/2018 | Anschuetz | B63B 79/40 |

OTHER PUBLICATIONS

International Search Report and Written Opinion for International Application No. PCT/US2011/052851 dated Feb. 3, 2012.
International Search Report and Written Opinion for International Application No. PCT/US2015/49527 dated Jan. 4, 2016.

* cited by examiner

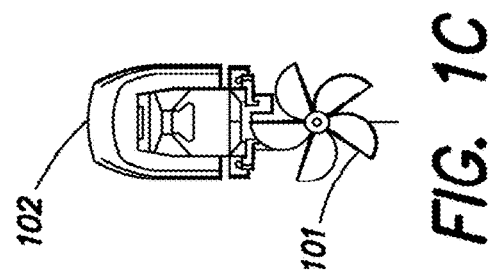
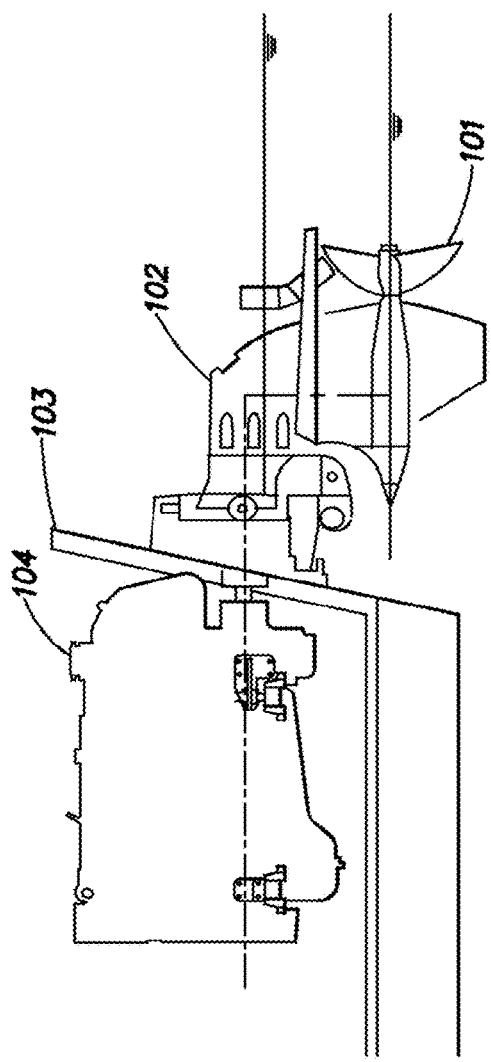
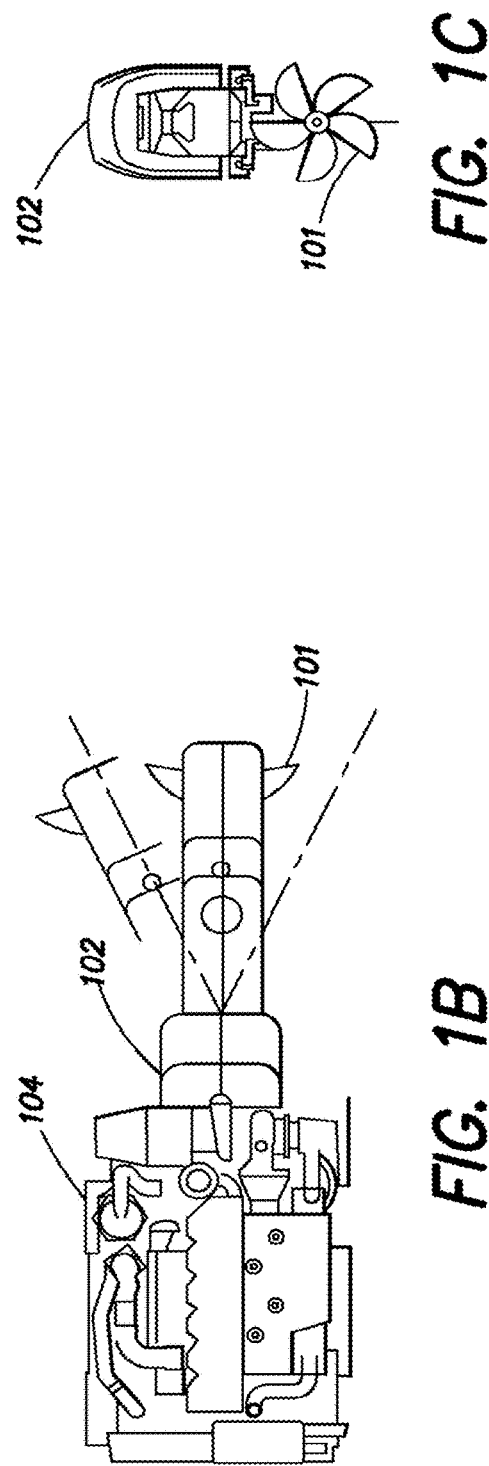

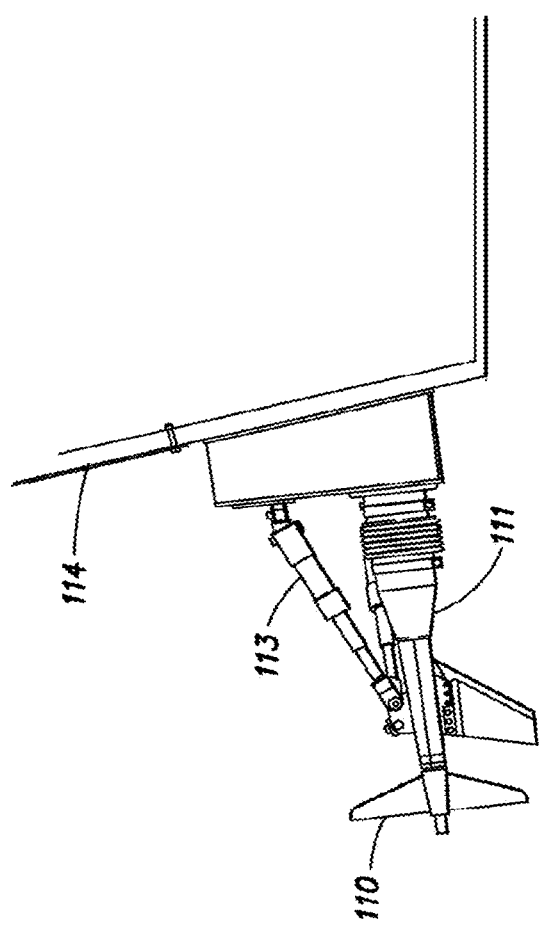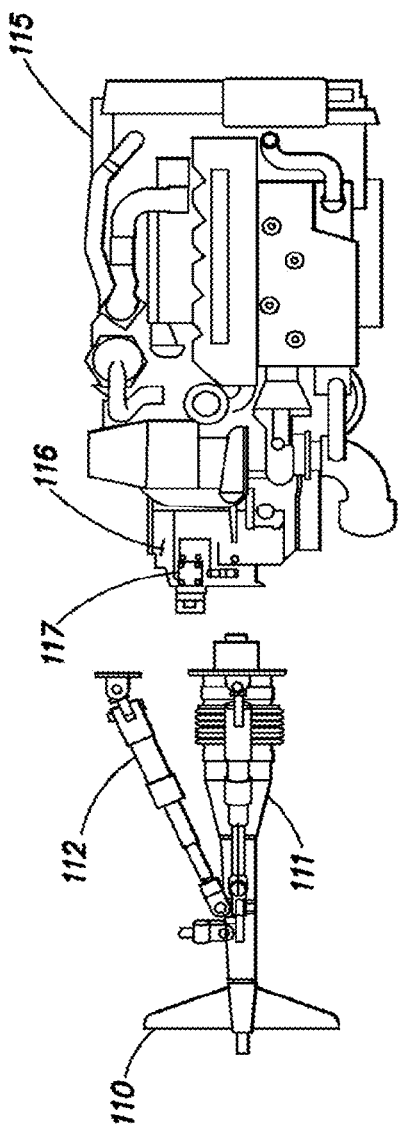

| | Steering Wheel Turned to Port 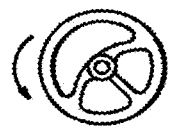 | Steering Wheel Straight 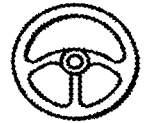 | Steering Wheel Turned to Starboard  |
|---|---|---|---|
| Port Thrust 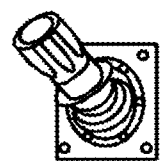 Zone 1 Forward | P  | Q 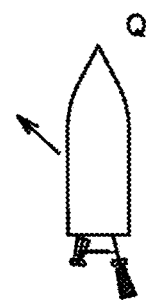 | R 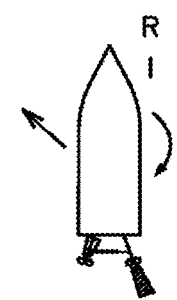 |
| Port Thrust 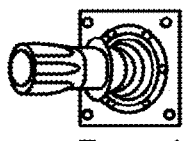 Zone 1 Transverse Only | G 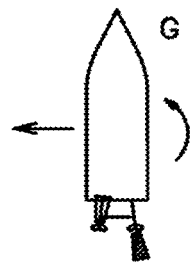 | H 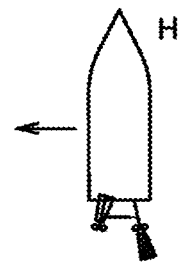 | I 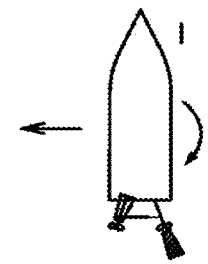 |
| Port Thrust  Zone 1 Reverse | S  | T  | U 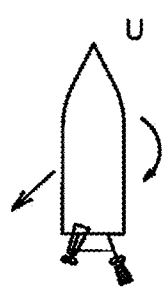 |
FIG. 5B

SYSTEM FOR CONTROLLING MARINE CRAFT WITH STEERABLE DRIVES

RELATED APPLICATIONS

This application is a Division of U.S. patent application Ser. No. 14/850,939, entitled "METHOD AND SYSTEM FOR DETERMINING AN ESTIMATED STEERING ANGLE" filed on Sep. 10, 2015, which claims the benefit of U.S. Provisional Application Ser. No. 62/048,792, entitled "SYSTEM FOR CONTROLLING MARINE CRAFT WITH STEERABLE DRIVE" filed on Sep. 10, 2014, each of which is herein incorporated by reference in its entirety. This application is related to U.S. patent application Ser. No. 13/241,192, which is hereby incorporated by reference in its entirety.

TECHNICAL FIELD

The present disclosure relates to marine vessel propulsion and control systems.

BACKGROUND

Various forms of propulsion have been used to propel marine vessels over or through the water. One type of propulsion system comprises a prime mover, such as an engine or a turbine, which converts energy into a rotation that is transferred to one or more propellers having blades in contact with the surrounding water. The rotational energy in a propeller is transferred by contoured surfaces of the propeller blades into a force or "thrust" which propels the marine vessel. As the propeller blades push water in one direction, thrust and vessel motion are generated in the opposite direction. Many shapes and geometries for propeller-type propulsion systems are known.

Other marine vessel propulsion systems utilize waterjet propulsion to achieve similar results. Such devices include a pump, a water inlet or suction port and an exit or discharge port, which generate a waterjet stream that propels the marine vessel. The waterjet stream may be deflected using a "deflector" to provide marine vessel control by redirecting some waterjet stream thrust in a suitable direction and in a suitable amount.

A requirement for safe and useful operation of marine vessels is the ability to steer the vessel from side to side. Some systems, commonly used with propeller-driven vessels, employ "rudders" for this purpose. Other systems for steering marine vessels, commonly used in waterjet-propelled vessels, rotate the exit or discharge nozzle of the waterjet stream from one side to another. Such a nozzle is sometimes referred to as a "steering nozzle." Hydraulic actuators may be used to rotate an articulated steering nozzle so that the aft end of the marine vessel experiences a sideways thrust in addition to any forward or backing force of the waterjet stream. The reaction of the marine vessel to the side-to-side movement of the steering nozzle will be in accordance with the laws of motion and conservation of momentum principles, and will depend on the dynamics of the marine vessel design.

It is understood that while particular control surfaces are primarily designed to provide force or motion in a particular direction, these surfaces often also provide forces in other to directions as well. Nonetheless, those skilled in the art appreciate that certain control surfaces and control and steering devices have a primary purpose to develop force or thrust along a particular axis. For example, in the case of a reversing deflector, it is the backing direction in which thrust is provided. Similarly, a rudder is intended to develop force at the stern portion of the vessel primarily in a side-to-side or athwart ships direction, even if collateral forces are developed in other directions. Thus, net force imparted to a marine vessel should be viewed as a vector sum process, where net or resultant force is generally the goal, and other smaller components thereof may be generated in other directions at the same time.

As noted above, a class of marine craft is propelled by multiple steerable propeller drives. FIGS. 1A-1C illustrate various views of a stern/out drive that can be used in combination and FIGS. 1D-1E illustrate various views of a surface drive 111 that can be used in combination as outboard motors. As these terms may be used interchangeably herein, the use of one term shall not imply that the scope of this disclosure is limited to one specific type of drive. The scope of this disclosure includes twin-drive systems, as well as systems comprising more than two drives. A quad-arrangement employing four drives, wherein a pair of drives is installed on each of two hulls of a catamaran hull form, is but one example of a system that can benefit from this disclosure.

A notional single-drive system is depicted in FIGS. 2A-2B, and a notional twin-drive system is shown in FIGS. 2C-2D. The twin-drive system illustrated in FIGS. 2C-2D comprise a port stern drive 205 and starboard stern drive 206 and a mechanical link known as a tie-bar 207. The primary purpose of the tie bar 207 is to prevent the closely-spaced drives 205, 206 from colliding into each other in order to avoid damage to the craft or injury or death to persons onboard.

Referring to FIGS. 3A-3B, in systems employing surface drives or ventilating propellers, the propellers 310, 311, 314 and 315 can be partially submerged for varying amounts of time, during which time the propellers can develop substantial lateral (athwartships) and vertical forces. In multiple-drive installations of this kind, the rotation of the at least two of the propellers typically opposes each other. When a tie bar is used in these installations, a substantial net force is exerted on the tie-bar due to the substantially equal and opposite lateral forces generated by the propellers. For example, as shown in FIG. 3A, tie bar 312 undergoes outward tension 313 when the propellers 310, 311 are outboard rotating; also as shown in FIG. 3B, tie bar 316 undergoes compression forces 317 if the propellers 314, 315 are to inboard rotating. By virtue of the tie-bar connection, the lateral forces are substantially cancelled out and the steering drives are not subjected to any significant load associated with the lateral force component of the partially submerged propellers.

In view of the above discussion, and in view of other considerations relating to design and operation of marine vessels, it is desirable to have a marine vessel control system which can provide thrust forces in a plurality of directions, and which can control thrust forces in a safe and efficient manner.

SUMMARY

Some embodiments provide for a system for controlling one or more propulsion devices of a marine vessel. The system comprises circuitry configured to: receive a steering angle command for a propulsion device of the marine vessel; receive a trim position of the propulsion device; and generate a steering actuator position command for the propulsion device based on the steering angle command and the trim position of the propulsion device.

Some embodiments provide for a method for controlling one or more propulsion devices of a marine vessel. The method comprises: receiving a steering angle command for a propulsion device of the marine vessel; receiving a trim position of the propulsion device; and generating a steering actuator position command for the propulsion device based on the steering angle command and the trim position of the propulsion device.

Some embodiments provide for a system comprising circuitry configured to: receive a steering actuator position of a steering actuator coupled to a propulsion device of the marine vessel; receive a trim position of the propulsion device; and determine a steering angle of the propulsion device based on the steering actuator position and the trim position.

Some embodiments provide for a method comprising: receiving a steering actuator position of a steering actuator coupled to a propulsion device of the marine vessel; receiving a trim position of the propulsion device; and determining a steering angle of the propulsion device based on the steering actuator position and the trim position.

Some embodiments relate to a computer readable medium having stored thereon instructions, which, when executed by a processor, perform such a techniques/methods.

The foregoing summary is provided by way of illustration and is not intended to be limiting.

BRIEF DESCRIPTION OF THE DRAWINGS

FIG. 1A illustrates a top view of an outboard drive that can be used in combination with embodiments disclosed herein;

FIG. 1B illustrates a side view of the outboard drive of FIG. 1A;

FIG. 1C illustrates a rear view of the outboard drive of FIG. 1A;

FIG. 1D illustrates a side view of the surface drive that can be used in combination with embodiments disclosed herein;

FIG. 1E illustrates a top view of an surface drive of FIG. 1D;

FIGS. 5A-5B are exemplary maneuvering diagrams illustrating movements that can be accomplished with a marine vessel configured with embodiments of this disclosure and dual outboard drives;

DETAILED DESCRIPTION

Figure 2A:
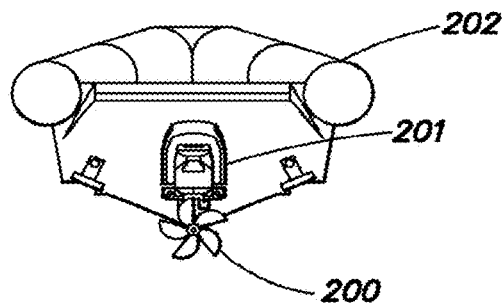
FIGS. 2A-2B illustrate rear view and top view of a marine vessel having a single outdrive.
Figure 2C:
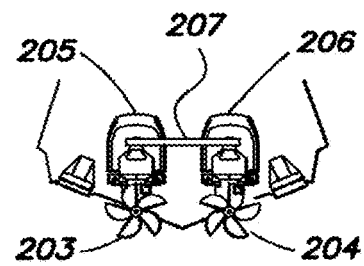
FIGS. 2C-2D illustrate rear view and top view of a marine vessel having dual outdrives and a tie-bar.
Figure 2B:
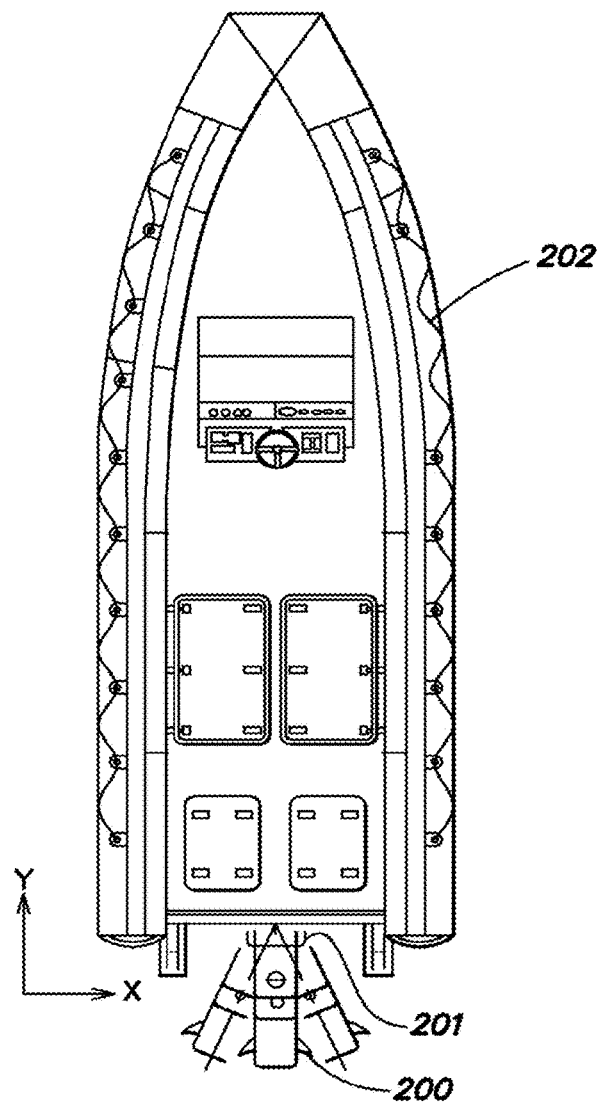
Figure 2D:
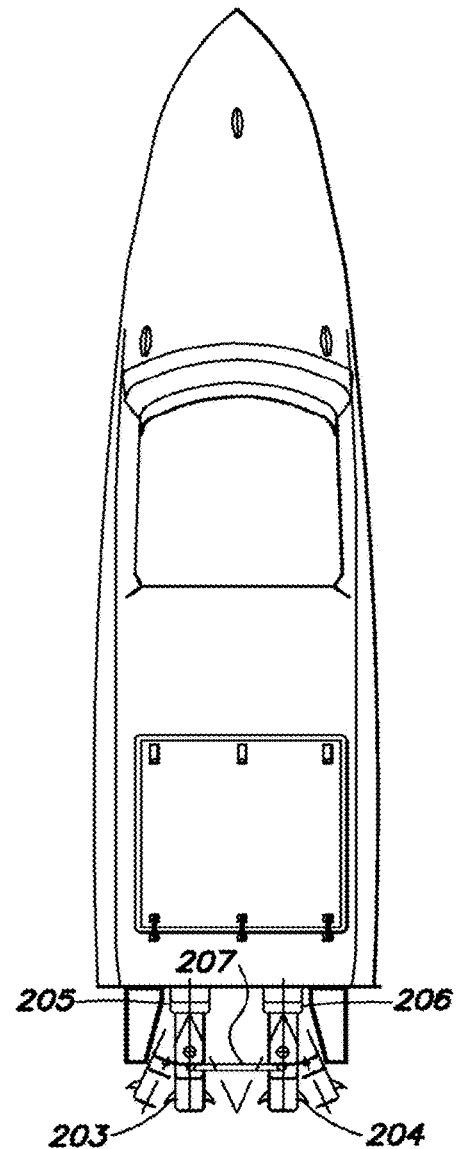
Figure 3A:
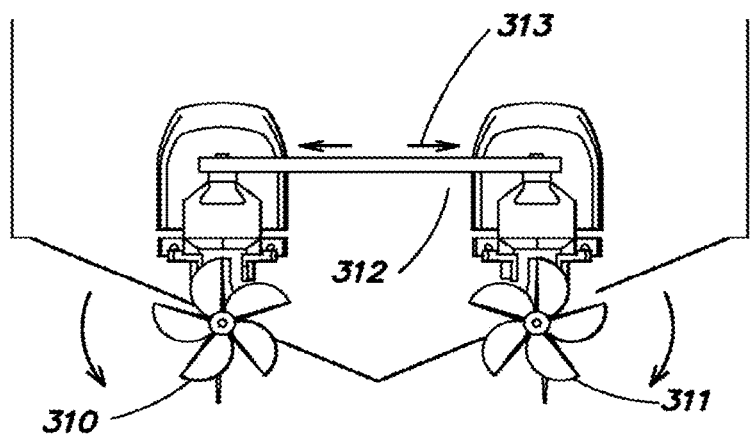
FIGS. 3A-3B illustrate forces generated on the tie bar by the dual outdrives of FIGS. 2A-2B.
Figure 3B:
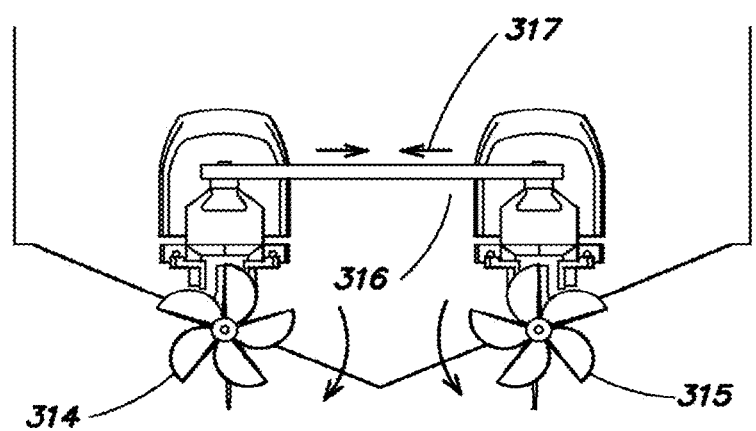

Prior to a detailed discussion of various embodiments of the present disclosure, it is useful to define certain terms that describe the geometry of a marine vessel and associated propulsion and control systems. A marine vessel has a forward end called a bow and an aft end called a stem. A line connecting the bow and the stern defines an axis hereinafter referred to the marine vessel's major axis. A vector along the major axis pointing along a direction from stem to bow is said to be pointing in the ahead or forward direction. A vector along the major axis pointing in the opposite direction (180° away) from the ahead direction is said to be to pointing in the astern or reverse or backing direction.

Any axis perpendicular to the major axis is referred to herein as a "minor axis." A vessel has a plurality of minor axes, lying in a plane perpendicular to the major axis. Some marine vessels have propulsion systems which primarily provide thrust only along the vessel's major axis, in the forward or backward directions. Other thrust directions, along the minor axes, are generated with awkward or inefficient auxiliary control surfaces, rudders, planes, deflectors, etc.

The axis perpendicular to the marine vessel's major axis and nominally perpendicular to the surface of the water on which the marine vessel rests, is referred to herein as the vertical axis. The vector along the vertical axis pointing away from the water and towards the sky defines an up direction, while the oppositely-directed vector along the vertical axis pointing from the sky towards the water defines the down direction. It is to be appreciated that the axes and directions, e.g. the vertical axis and the up and down directions, described herein are referenced to the marine vessel. In operation, the vessel experiences motion relative to the water in which it travels. However, the present axes and directions are not intended to be referenced to Earth or the water surface.

The axis perpendicular to both the marine vessel's major axis and a vertical axis is referred to as an athwartships axis. The direction pointing to the left of the marine vessel with respect to the ahead direction is referred to as the port direction, while the opposite direction, pointing to the right of the vessel with respect to the forward direction is referred to as the starboard direction. The athwartships axis is also sometimes referred to as defining a transverse or "side-to-side" force, motion, or displacement. Note that the athwartships axis and the vertical axis are not unique, and that many axes parallel to said athwartships axis and vertical axis can be defined.

The marine vessel may be moved forward or backwards along the major axes. This motion is usually a primary translational motion achieved by use of the vessels propulsion systems when traversing the water as described earlier. Other motions are possible, either by use of vessel control systems or due to external forces such as wind and water currents. Rotational motion of the marine vessel about the athwartships axis which alternately raises and lowers the bow and stern is referred to as pitch of the vessel. Rotation of the marine vessel about its major axis, alternately raising and lowering the port and starboard sides of the vessel to is referred to as roll. Finally, rotation of the marine vessel about the vertical axis is referred to as yaw. An overall vertical displacement of the entire vessel 10 that moves the vessel up and down (e.g. due to waves) is called heave.

In view of the above discussion, and in view of other considerations relating to design and operation of marine vessels, it is desirable to have a marine vessel control system which can provide forces in a plurality of directions, and which can control thrust forces in a safe and efficient manner. The present disclosure relates to marine vessel propulsion and control systems and more particularly to methods and devices for controlling and allowing marine vessel steering drives to move freely with respect to each other but to also prevent such steering drives from contacting each other. The disclosure also relates to a control system and method configured to receive at least a first vessel control signal corresponding to any of a rotational movement command, a translational movement command, and a combination of a rotational movement and a translational movement commands, and configured to generate at least a first steerable drive actuator control signal and a second steerable drive actuator control signal to control the first steerable drive and the second steerable drive to provide the fixed distance between the first and second steerable drives and so as to individually control the first steerable drive and the second steerable drives and allow the so the first steerable drive and the second steerable drive to move relative to each other. The disclosure also relates to the control system and method also configured to induce a net force to the marine vessel substantially in a direction of the first vessel control signal that corresponds to a combination of a translational thrust command and a rotational thrust command, for all combinations of the rotational and translational thrust commands. The disclosure is illustrated in connection with propulsion systems comprising first and second steerable drives, particularly first and second outboard drives. However it is to be understood that some or all aspects of the present disclosure apply to systems using equivalent or similar components and arrangements, such as waterjet propulsion systems and systems using various prime movers not specifically disclosed herein.

Figure 4A:
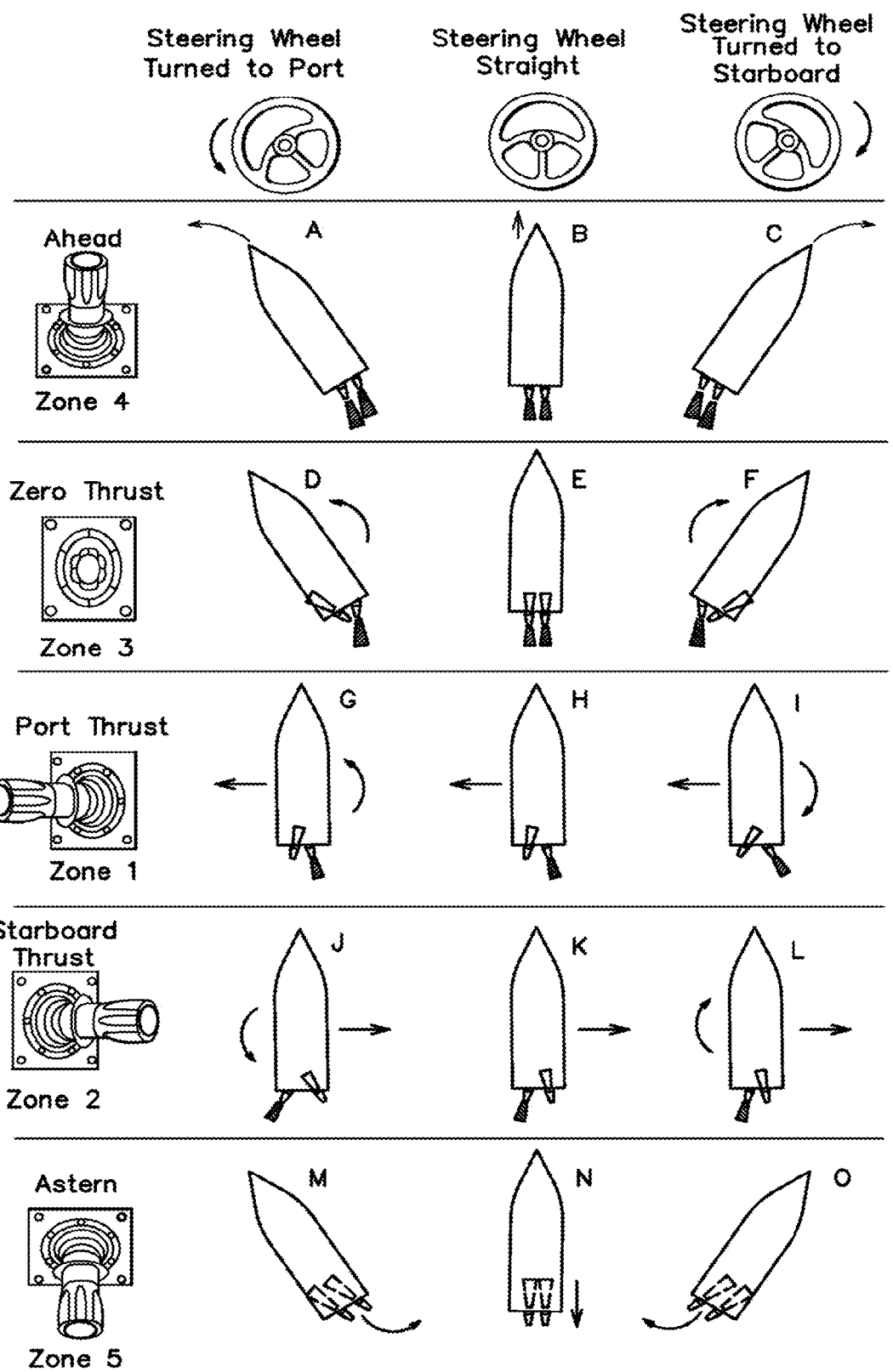
FIGS. 4A-4B are exemplary maneuvering diagrams illustrating movements that can be accomplished with a marine vessel configured with applicant's own joystick controller system and dual waterjets.
Figure 4B:
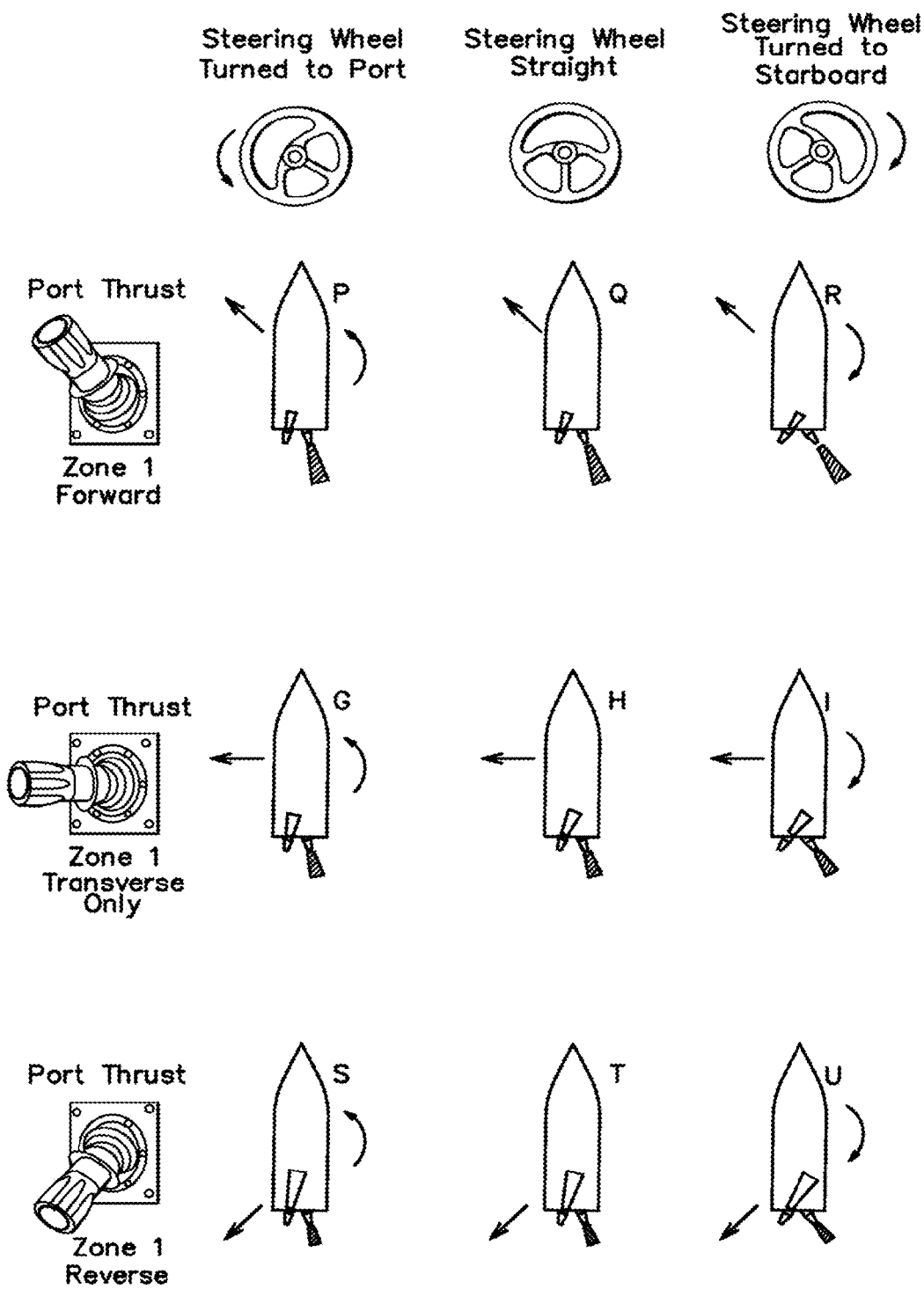

Referring to FIGS. 4A and 4B, there is illustrated an exemplary maneuvering diagram as described in U.S. Pat. No. 7,601,040 B2 corresponding to a joystick control system disclosed in the U.S. Pat. No. 7,601,040 B2 patent, that can be deployed on a waterjet-propelled craft. A primary challenge in achieving similar capability in marine craft equipped with steerable propellers and various other types of drives is that the drives are decoupled, which present a high risk that the propellers will contact each other and cause damage when controlling the steerable drives individually.

Thus, there is a need for a system to enhance the performance of marine craft fitted with multiple steerable propellers to eliminate the risk of contact of the propellers and that also provides for individual control of the steerable drives. It is appreciated that the high-speed and low-speed performance of a marine craft (planing type or otherwise) fitted with multiple steerable drives can be improved by decoupling the steering control of each drive such that the steering function of each drive is independently controlled with a separate actuator. The various embodiments of the system(s) disclosed herein facilitate individual control of each steerable drive, thereby rendering a propulsion system with greater degrees of freedom and which can take full advantage of a joystick maneuvering system or other means of control, whereby variable force vectors can be developed. Such individual control and force vectoring capability, not otherwise achievable when steerable drives are mechanically linked such that the drives remain substantially parallel to each other irrespective of the steering angle, enhances maneuvering performance. The various embodiments of a system disclosed herein allow the drives to move freely while preventing the drives from contacting each other.

If the two or more drives are decoupled such that the steering angle of each drive can be controlled independently, many of the control algorithms and resulting features and advantages of the systems and methods disclosed in U.S. Pat. Nos. 7,052,338; 7,037,150; 7,216,599; 7,222,577; 7,500,890'; 7,641,525; 7,601,040; 7,972,187; and published U.S. patent application Ser. Nos. 11/960,676; 12/753,089, which are herein incorporated by reference in their entirety, can be achieved. In particular, FIGS. 42 and 43 of U.S. Pat. No. 7,601,040 B2 shows a series of maneuvers that can be achieved by individually controlling integral nozzle/reversing bucket devices. As described in column 42 and shown in FIGS. 44-48 (example steerable propeller control algorithm) of the same application, similar thrust vectoring results can be achieved by using steerable propellers instead of waterjets.

Figure 5A:
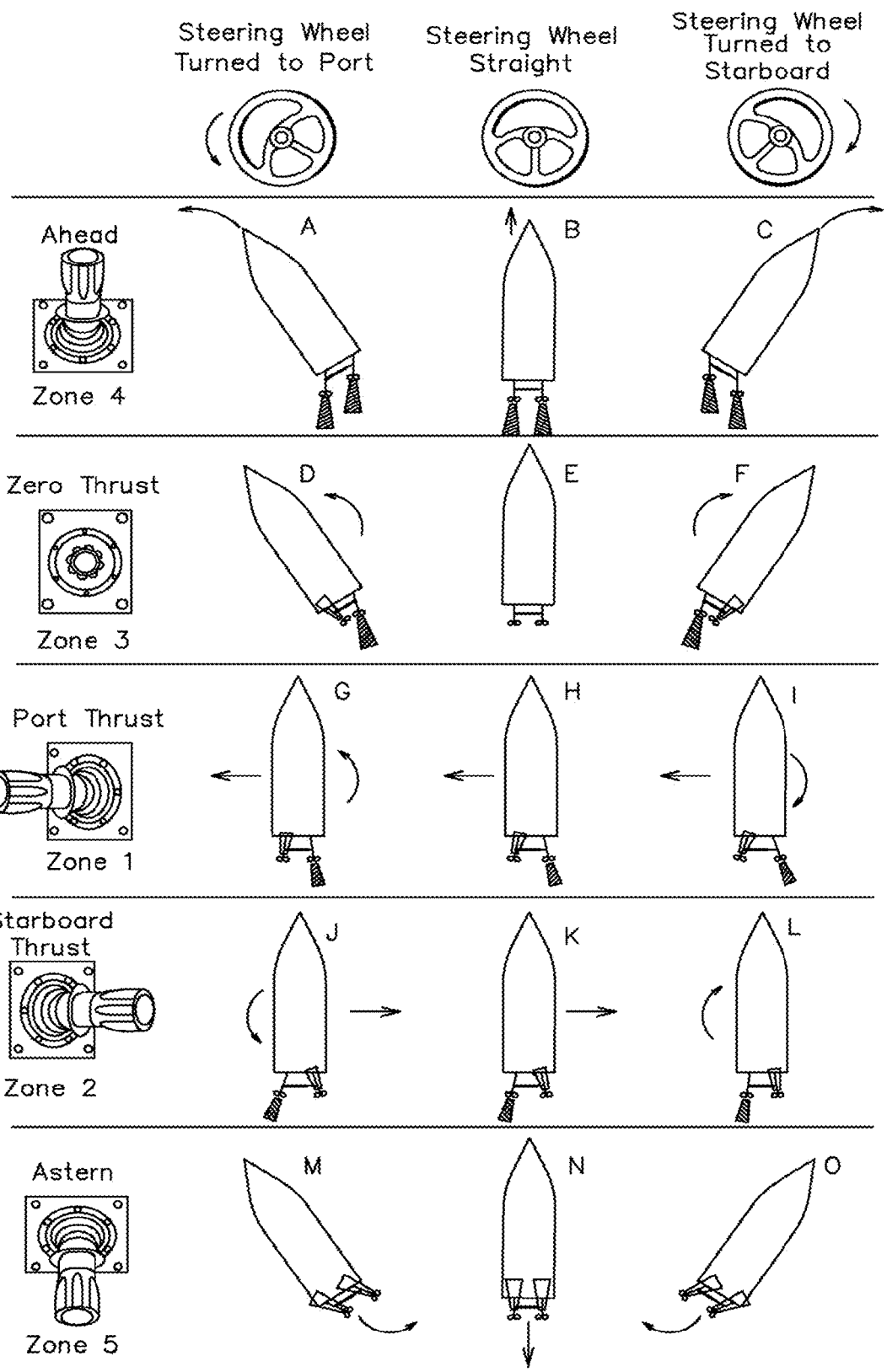

As an example, replacing the conventional tie bar with one of the embodiments disclosed herein enables a joystick system or other electronic control system to maneuver a dual steerable propeller driven craft in accordance with the maneuvering diagram depicted in FIGS. 5A and 5B, which illustrate the movements of the craft corresponding to various positions of the joystick and tiller (or steering wheel). The maneuvering diagram depicted in to FIGS. 5A and 5B reflects the capabilities of a joystick control system with underlying control algorithms incorporating a trolling gear summarized in FIGS. 12-17. To aid in disclosing the control algorithms with trolling gear functionality included, FIG. 12 defines five control zones (1-5) in terms of joystick position, and FIGS. 13-17 present the steerable propeller control algorithm signal diagram for Zones 1-5, respectively.

One problem with decoupling the steering control of drives located in close proximity to each other is the potential for the drives to collide and interfere with one another. While the electronic control system can, in principle, be configured to prevent a collision under normal operating conditions, the risk that the drives will collide becomes unacceptable in the event that the control system malfunctions or one or both of the drives is manually overridden. For this reason, a tie-bar is typically installed.

Figure 6A:
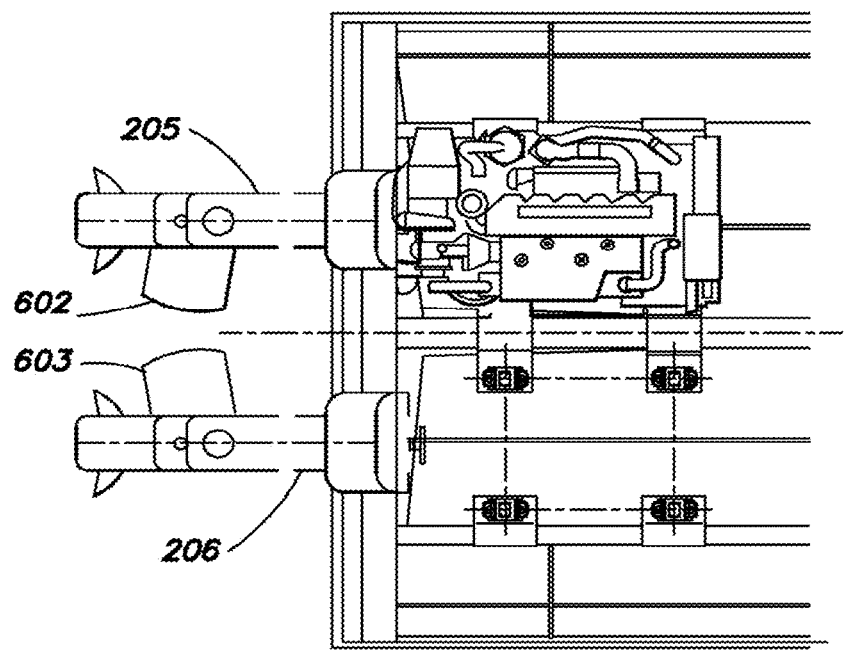
FIGS. 6A-6B illustrate an embodiment of guards according to this disclosure that can be used with a marine vessel configured with dual outboard drives.
Figure 6B:
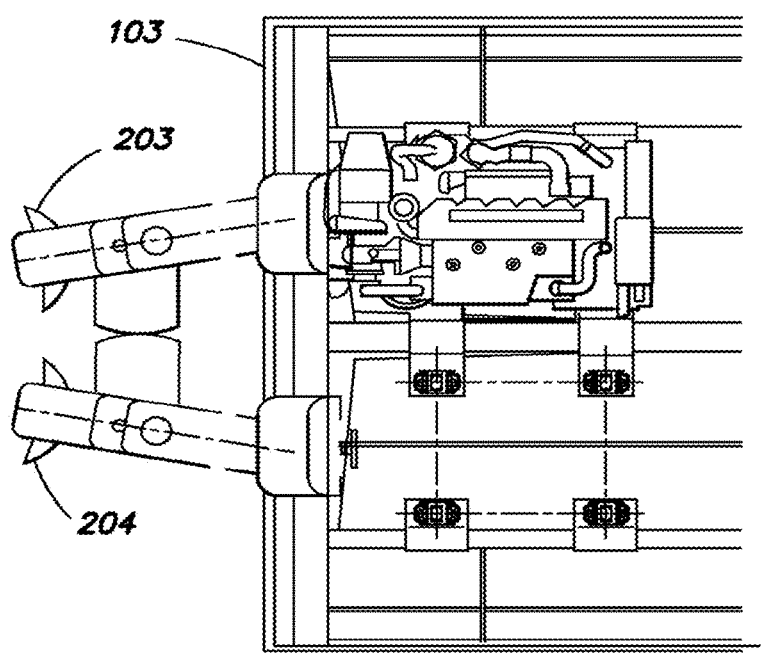

A solution to the problem of preventing colliding of adjacent drives while providing freedom to independently steer the drives is to install a device that allows the drives to move freely while preventing the clearance between the drives from dropping below a certain minimum value. One embodiment comprises a mechanical guard or bumper installed on one or multiple drives such that the guard(s) make contact when a certain minimum clearance is attained, thereby preventing any sensitive components, such as the propeller, from making contact. The guards would be designed to take the full force of the actuating system without harming any part of the drive. An example of this type of arrangement is illustrated in FIG. 6A (drives parallel) and FIG. 6B (drives positioned inward), in which port bumper guard 602 and starboard bumper guard 603 is mounted to port drive 205 and starboard drive 206, respectively. It is to be appreciated that various alterations, modifications, and improvements of the example shown in FIGS. 6A-B will occur to those skilled in the art. Such alterations, modifications, and improvements are intended to be part of this disclosure and are intended to be within the scope of the system disclosed herein.

Figure 7A:
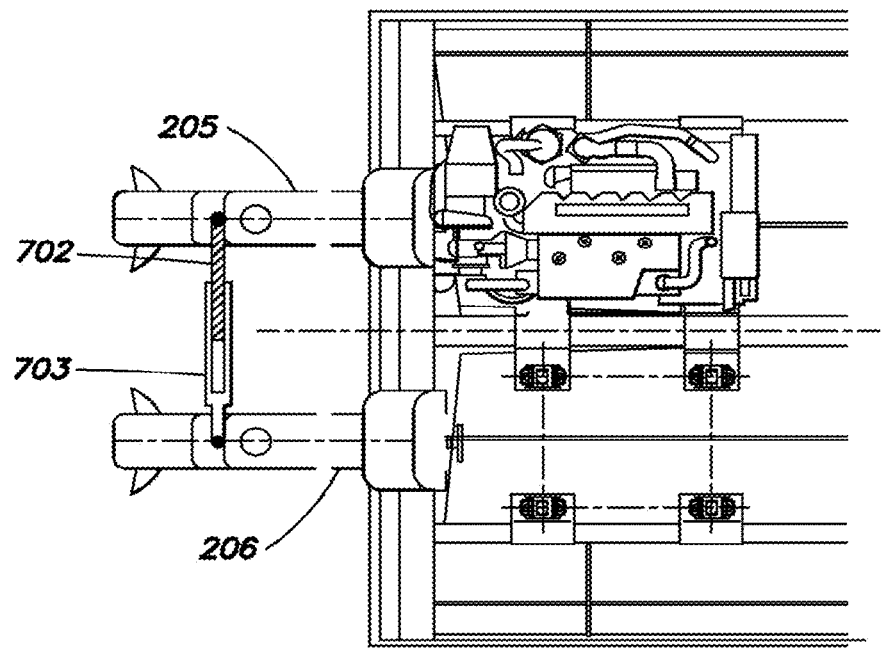
FIGS. 7A-7B illustrate an embodiment of a sliding bar according to this disclosure that can be used with a marine vessel configured with dual outboard drives.
Figure 7B:
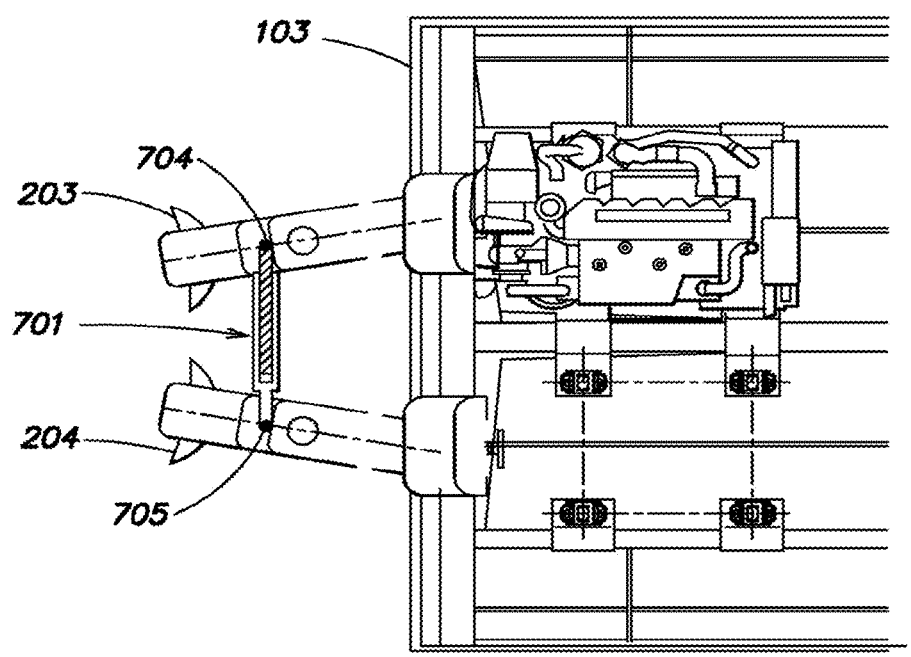

Another embodiment comprises a sliding apparatus located in between and attached to adjacent drives and incorporating a mechanical stop to prevent the clearance between the drives from dropping below a certain value. The device may consist of two or more members (which may or may not be connected) that are allowed to move or rotate with respect to each other, and which incorporates one or more mechanical stops to prevent the clearance between propellers and other critical components from dropping below a certain value. One embodiment consists of telescoping concentric tubes installed between adjacent drives, which are attached to each end of the sliding apparatus by means of a connection such as a pin or ball joint A mechanical stop built into the sliding apparatus prevents the clearance between adjacent drives from dropping below a certain value. Another embodiment comprises a sliding bar arrangement consisting of an assembly of two or more parallel bars that are permitted to slide relative to one another. A schematic example of this type of system can be seen in FIG. 7A (drives parallel) and FIG. 7B (drives positioned inward), in which sliding bar assembly 701 comprises rod 702 and tube 703, port attachment (joint) 704 and starboard attachment (joint) 705. Yet another embodiment consists of two members flexibly joined together to allow rotation with respect to each other, with the free end of each member flexibly joined to a drive, wherein relative rotation of the two members results in varying distances between the two free ends; a means to limit the relative rotation, such as a mechanical stop, would be provided to prevent the clearance between drives from dropping below a certain value. Variations of these implementations include but are not limited to those incorporating alternate means of attachment, for example, a compound clevis (allowing two rotational degrees freedom) or a ball joint (allowing three rotational degrees of freedom). Other variations of these implementations include but are not limited to those incorporating alternate means of achieving variable distance between the drives, for example, a hydraulic cylinder deployed in any number of ways to facilitate the functionality described above. It is to be appreciated that various alterations, modifications, and improvements of the example shown in FIGS. 7A-B and embodiments described herein will occur to those skilled in the art. Such alterations, modifications, and improvements are intended to be part of this disclosure and are intended to be within the scope of the system disclosed herein.

In the typical surface-drive or ventilating propeller application, the propellers can be partially submerged for varying amounts of time, during which time the propellers develop substantial lateral (athwartships) and vertical forces. In most of these kinds of multiple-drive installations, the rotation of at least two of the propellers opposes each other. When a tie bar is used in these installations, a substantial net force is exerted on the tie-bar (tension if outboard rotation, compression if inboard rotation) due to the substantially equal and opposite lateral forces generated by the propellers. By virtue of the tie-bar connection, the lateral force transferred to the hull by an individual drive is minimized, and the steering cylinder(s) is not subjected to significant load associated with the lateral force component of the partially to submerged propellers.

On account of the lateral forces induced by the surface propeller (discussed above), removing the tie-bar that would otherwise nullify the lateral forces will necessitate the individual steering cylinders to counter the forces of each individual drive. In such an arrangement, the mechanical loading of the steering cylinders will likely be increased substantially, and in many cases, the standard mechanical and hydraulic components that are normally equipped with the drive will be inadequately sized to counter the load in a steady and/or dynamic condition. In these cases it would be useful to have a variable-length or variable-geometry tie-bar that is locked in conditions when the lateral force on an individual propeller is substantial and unlocked (such that the drives could be controlled individually) when it is desirable to move the drives relative to each other. Such an "adaptive" tie-bar could have a locking means that is mechanical (controlled via a linkage), hydraulic (controlled using a mechanical or electric valve), or electric (clutch, motor, etc.), or a combination of these methods. The adaptive (or variable-geometry lockable) tie-bar described above may or may not incorporate a mechanical stop for the purpose of limiting the clearance between adjacent drives.

Figure 9:
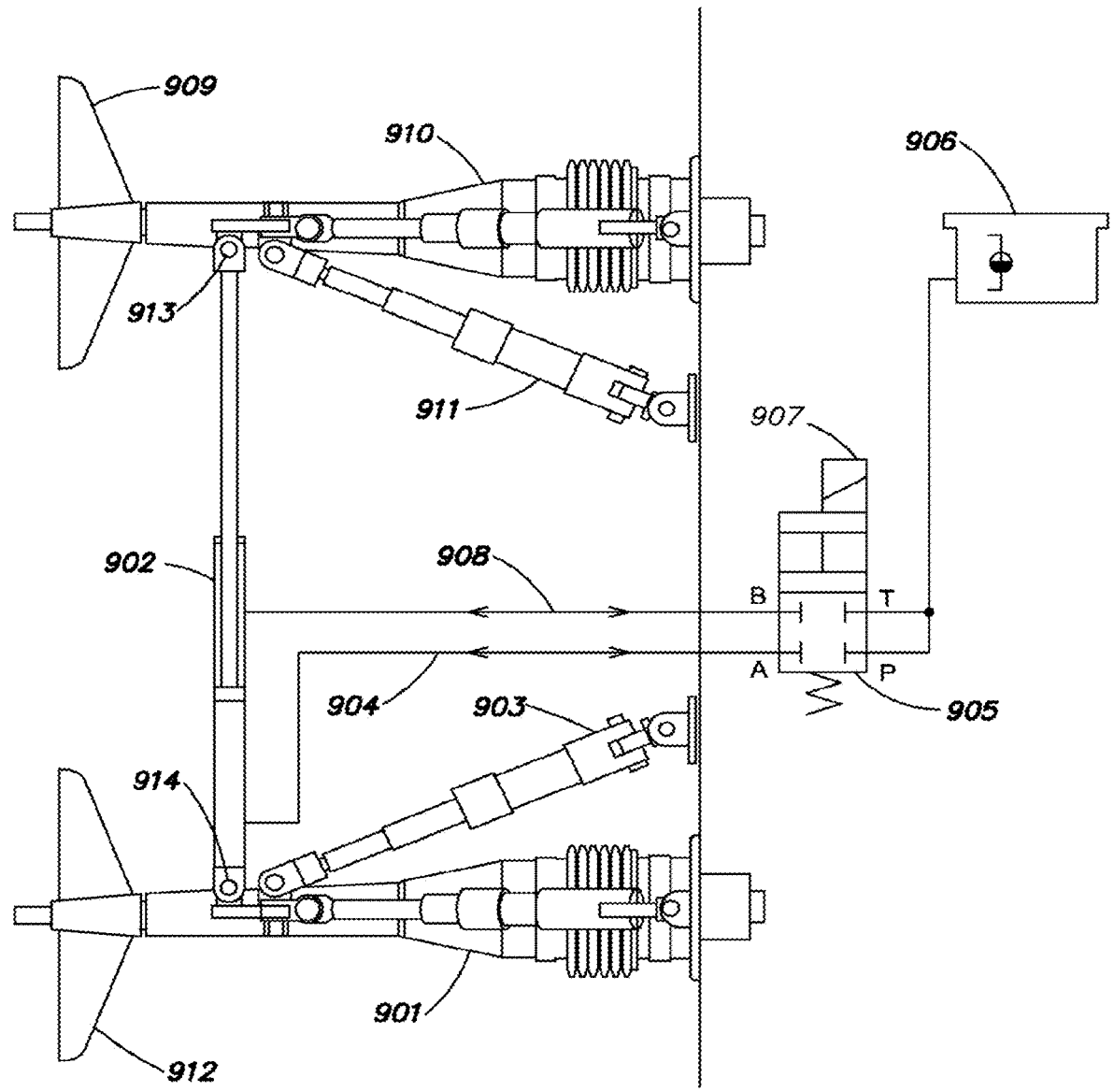
FIG. 9 illustrates an embodiment of a hydraulic locking system variable length tie-bar according to this disclosure that can be used with a marine vessel configured with dual outboard drives.

One example of a locking tie-bar implementation is the system shown in FIG. 9, where the conventional tie-bar is replaced with a hydraulic cylinder 902 operating in a passive mode, i.e., no hydraulic pump is utilized. The ends of hydraulic cylinder 902 are fitted with port attachment (joint) 913 and starboard attachment (joint) 914. When the hydraulic fluid is confined to the cylinder 902 by means of control valve 905 (shown in FIG. 9) in the locked position, the hydraulic lock causes cylinder 902 to behave in the manner of a conventional tie-bar, whereby drives 901 and 910 are maintained in a fixed relationship relative to each other.

When one or both drives are to be moved relative to the other, for example, when performing maneuvers such as illustrated in FIG. 5A, the hydraulic fluid is permitted to move from one side of the piston in cylinder 902 to the other side by actuating control valve 905 such that fluid is allowed to move freely between Ports P and A and Ports T and B, with any excess (make-up) fluid channeled to (from) reservoir 906, depending on the direction of stroke. Depending on the implementation of the control system, control valve 905 may be configured so that it is in the closed or open position when actuated. It is to be appreciated that various alterations, modifications, and improvements of the example shown in FIG. 9 will occur to those skilled in the art. Such alterations, modifications, and improvements are intended to be part of this to disclosure and are intended to be within the scope of the system disclosed herein.

As discussed above, the forces that may be encountered when the propeller is partially submerged can be quite substantial, potentially causing some difficulty creating the forces to move the drives when the tie-bar is unlocked. In these cases it may be advantageous to deploy a device or some means to create tension and/or compression forces within or in place of the tie-bar apparatus. Such a device could reduce the forces that are imposed on the individual steering cylinders, due to the fact that the applied force vector is substantially orthogonal to the drive axis. Any of the "adaptive" tie-bar designs discussed above (mechanical, hydraulic, electric, etc.) can be combined with a means to develop tension and or compression forces to create an "active" tie-bar device. The active (or actuating) tie-bar described above may or may not incorporate a mechanical stop for the purpose of limiting the clearance between adjacent drives.

Figure 8C:
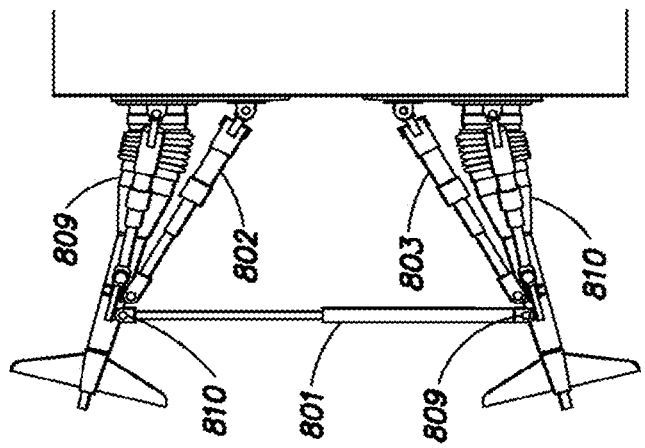
FIGS. 8A-8C illustrate an embodiment of a variable length tie-bar according to this disclosure that can be used with a marine vessel configured with dual outboard drives.
Figure 8B:
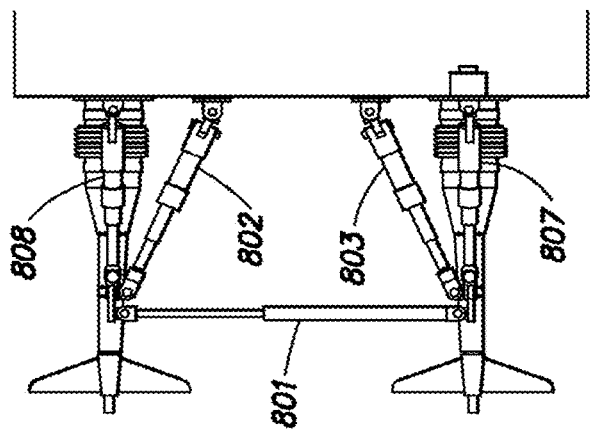
Figure 8A:
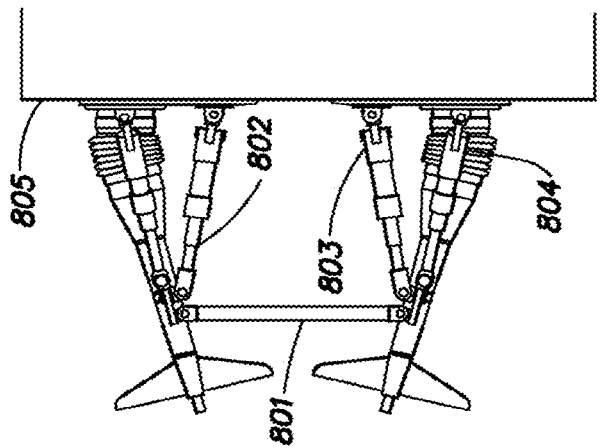
Figure 10:
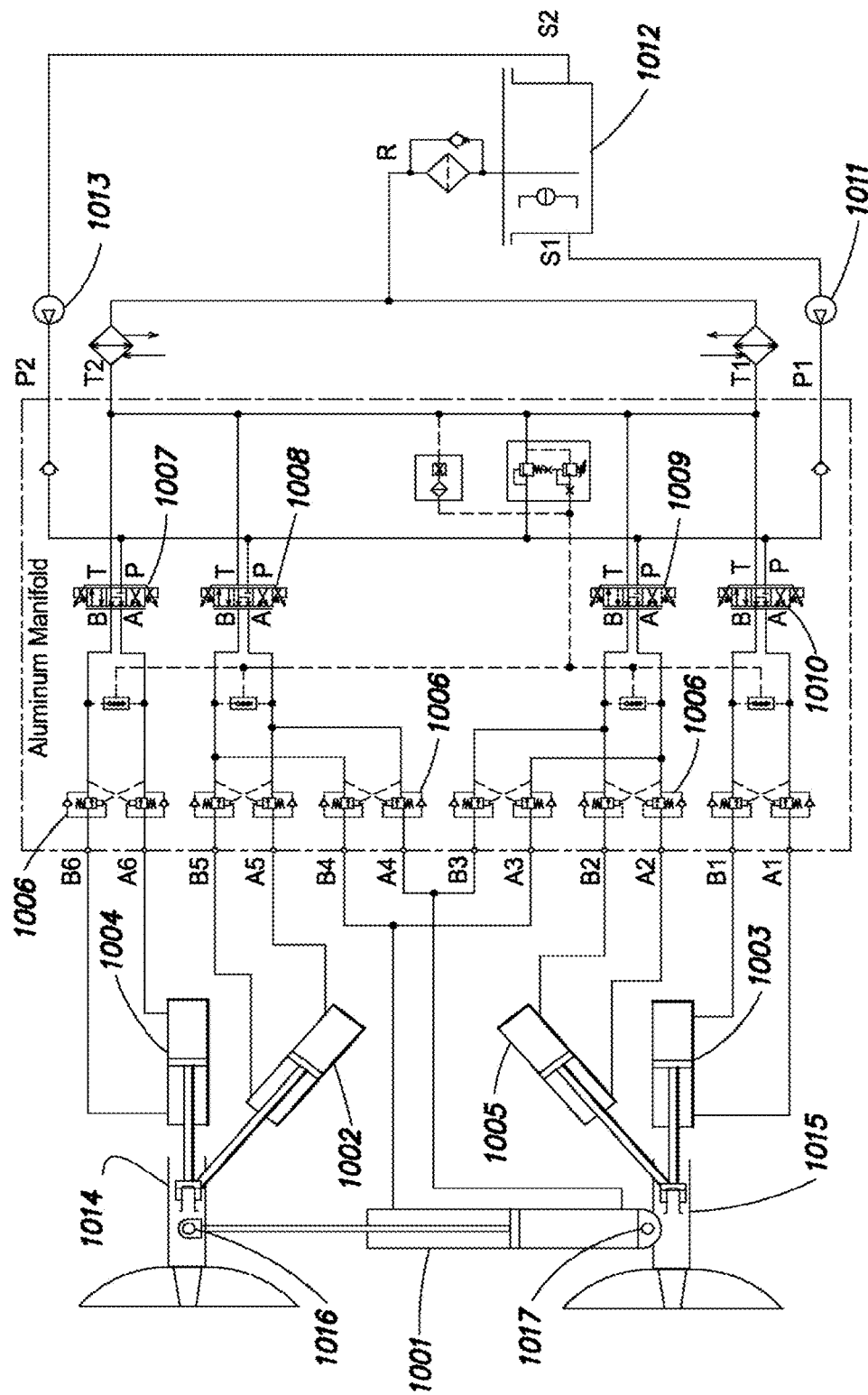
FIG. 10 illustrates an embodiment of a hydraulic system that can be used with the hydraulic variable length tie-bar of FIG. 9.

One example of an active tie-bar implementation utilizes similar outboard components (i.e., those external to the hull) as used in the example locking tie-bar implementation (shown in FIG. 9 and also as shown in FIGS. 8A, 8B and 8C). However, the hydraulic system for the active tie-bar system will differ from that of the locking tie-bar system in that the hydraulic system for the active tie-bar system enables the active extension and retraction of active tie-bar 1001. For example, the hydraulic schematic for one embodiment of the active tie-bar system is shown in FIG. 10, which depicts hydraulic cylinder 1001 linking port drive 1014 and starboard drive 1015. The ends of hydraulic cylinder 1001 are fitted with port attachment (joint) 1016 and starboard attachment (joint) 1017. In this particular implementation, in the locked state the hydraulic fluid is locked in the cylinder by means of counterbalance valves 1006, and the tie-bar arrangement behaves similar to a conventional tie-bar, whereby the port and starboard drives are maintained in a fixed relationship relative to each other. When one or both drives are to be moved relative to the other, pressurized fluid is delivered by pump 1011 and/or 1013 to one side of the piston in cylinder 1001 via port steering valve 1008 and/or starboard steering valve 1009, as the case may be, while fluid on the other side of the piston is allowed to escape back to reservoir 1012.

The hydraulic system shown in FIG. 10 is one example of how an electro-hydraulic control system could be adapted to integrate the use of an active electro-hydraulic tie-bar system. In the example shown in FIG. 10, the working ports (A & B) of steering valves 1008 and 1009 are also connected to the Hydraulic-Actuator Tie-Bar (in addition to the steering actuators) through two dedicated sets of counterbalance valves 1006. The cylinder-side ports (A3 & B3 for STBD and A4 & B4 for PORT) of the dedicated tie-bar counterbalance valves are then ported to the tie-bar actuator such that actuating a single steering actuator (port or starboard) via the respective steering valve will also actuate the Hydraulic-Actuator Tie-Bar in the correct direction and not affect the steering actuator that is not being actuated. The circuit in FIG. 10 will also allow both steering valves and corresponding actuators to be actuated simultaneously. The circuit illustrated in FIG. 10 is one example of a hydraulic circuit designed to actuate the active tie-bar system. It is to be appreciated that various alterations, modifications, and improvements of the example shown in FIGS. 8A-C and FIG. 10 will occur to those skilled in the art. For example, other embodiments of the active tie-bar may incorporate any device that can generate a suitable force, including but not limited to hydraulic cylinders, electrically-actuated power screws, pneumatic actuators, electromechanical devices, geared mechanisms, etc., and it is understood that any number of configurations within a given class of actuator may be adopted. Such alterations, modifications, and improvements are intended to be part of this disclosure and are intended to be within the scope of the system disclosed herein. One skilled in the art can modify the circuit in numerous ways, for example, by incorporating different types of valves and porting to perform the same function.

Figure 11A:
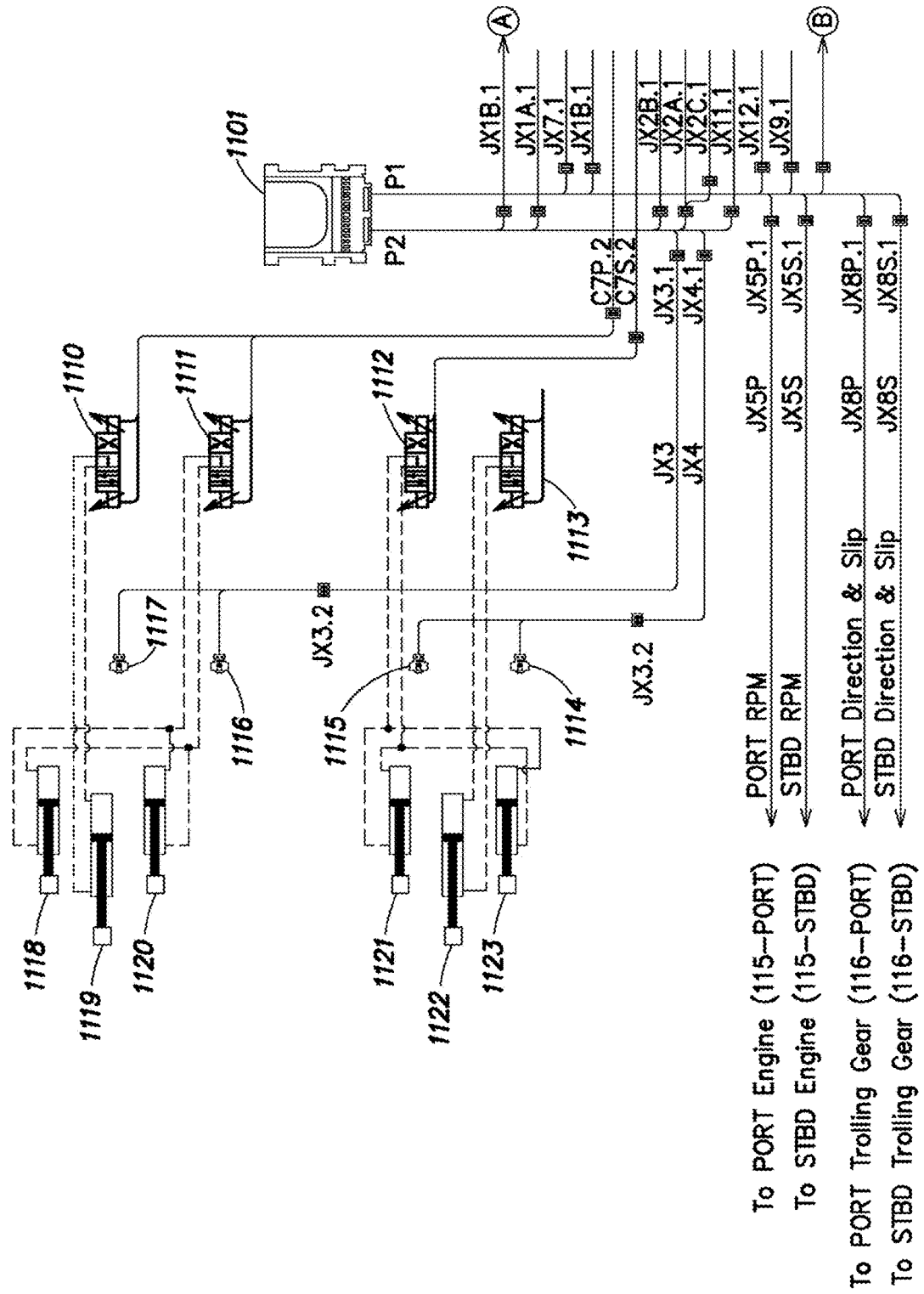
FIGS. 11A and 11B illustrate an embodiment of a control system that can be used with the hydraulic variable length tie-bar of FIG. 9.
Figure 11B:
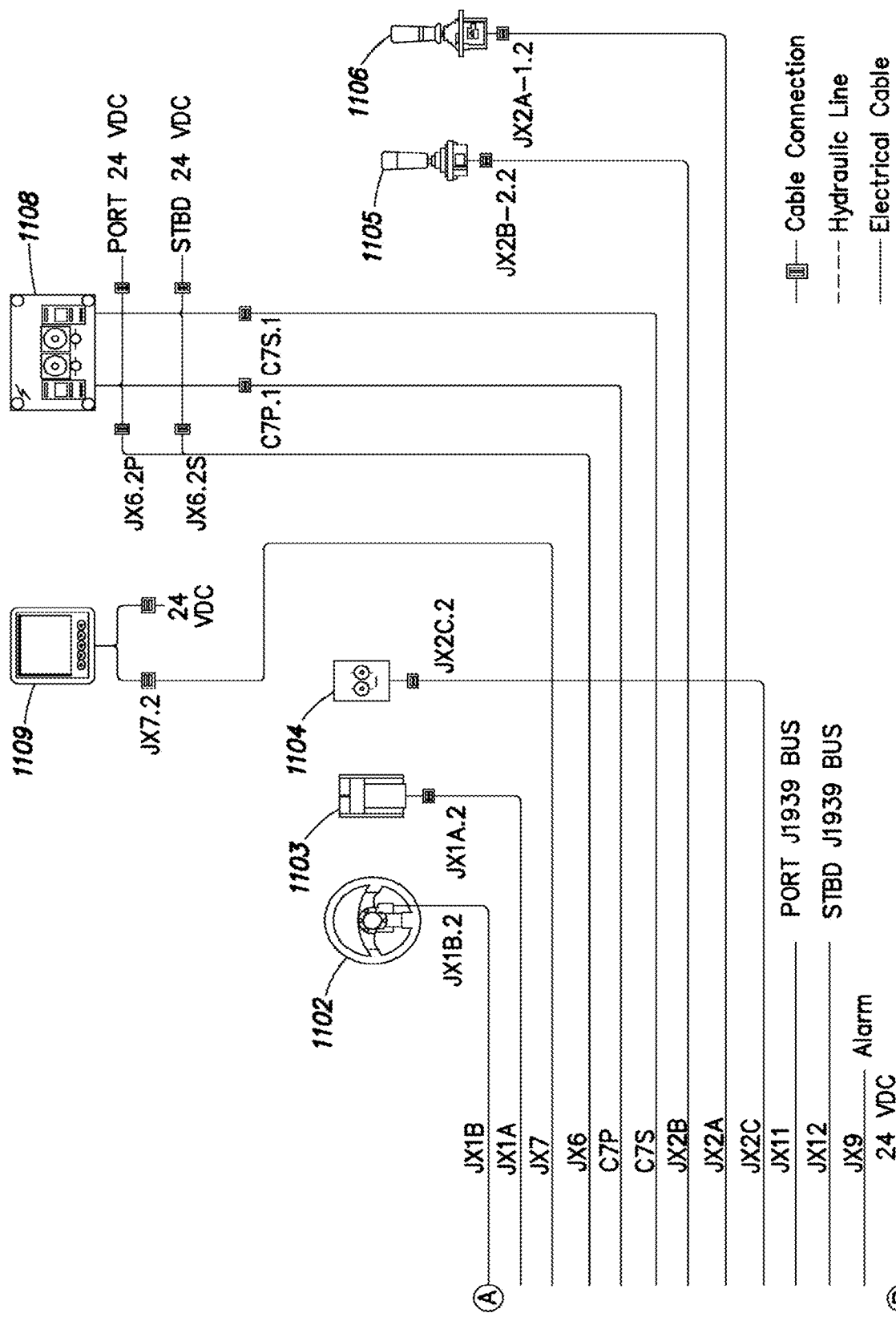

By way of example, FIG. 11 illustrates one embodiment of a system diagram for the device and embodiments thereof described herein.

Figure 12:
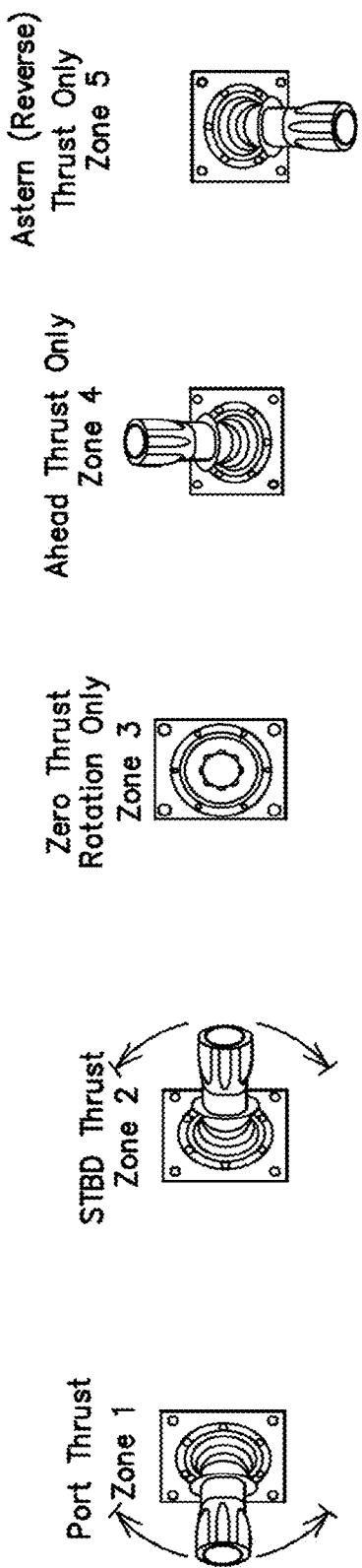
FIG. 12 illustrates various joystick control zones and movements.
Figure 13:
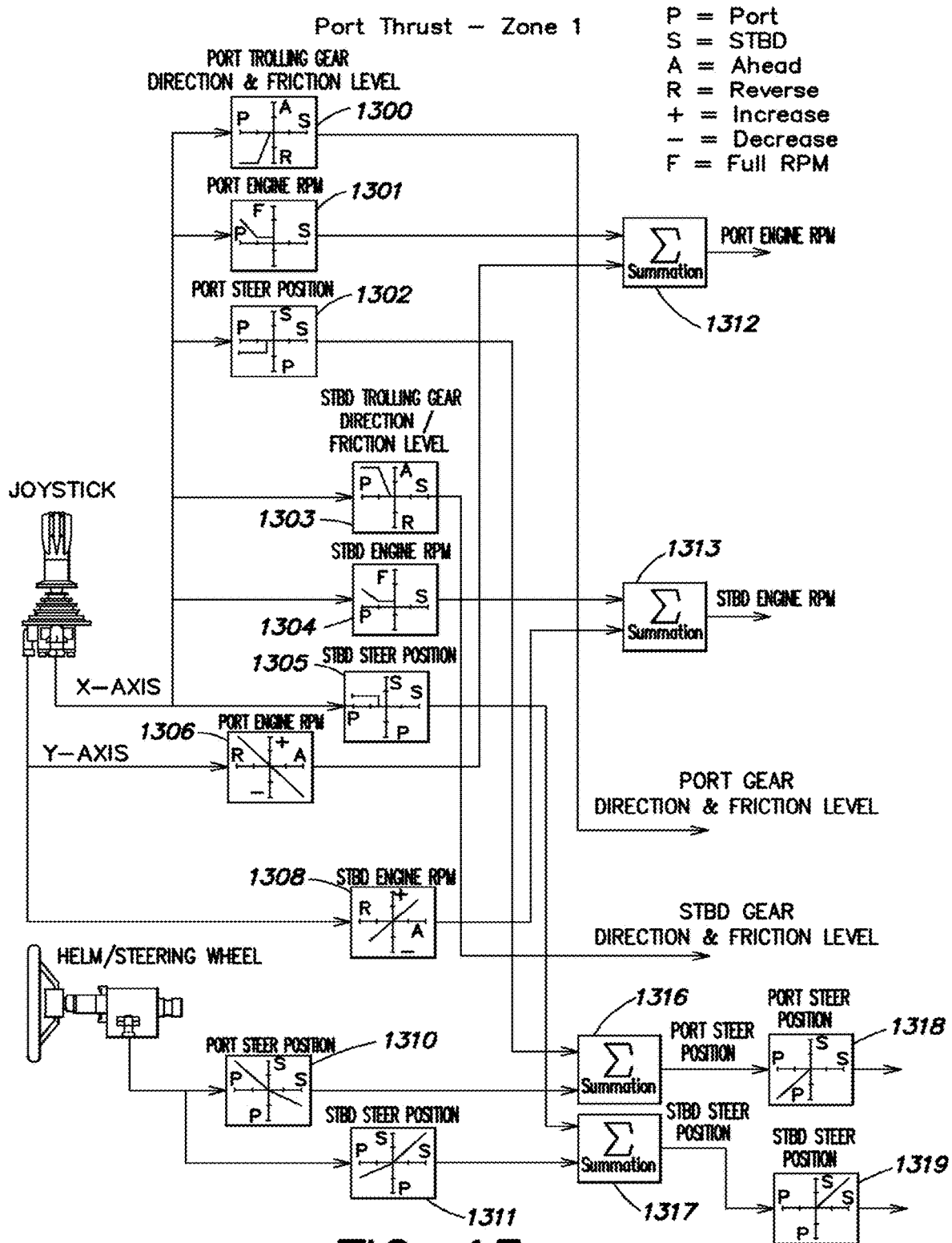
FIG. 13 illustrates an embodiment a control system and process for Zone 1 of the joystick controller of FIG. 12, which can be used with steerable propellers and a trolling gear.

One system and method of implementing a joystick control algorithm for a dual-drive system is to separate the control algorithms into five separate control zones as shown in FIG. 12, which are illustrated in more detail in FIGS. 13-17. By separating the algorithms into distinct zones, the difference in response characteristics of the steerable drive, for example between ahead and reverse thrust, can be compensated for by applying a different set of curves for the respective zones. One embodiment of such a system splits the control algorithms into five different zones that relate to the direction of applied net translational thrust: Port Thrust, Starboard Thrust, Zero Thrust (rotation only), Ahead Thrust Only (i.e., no side or reverse thrust) and Astern Thrust Only, as shown in FIG. 12. It is, of course, possible to utilize more or less than five zones, depending on the specific implementation of algorithms and function modules. However, the underlying goal is to create a system that compensates for the discontinuities in the force and motion created by the combination of propulsion devices, including characteristics of transmission gear and associated trolling gear (if available), in response to command or actuator inputs, for example, by changing the steering position mapping to steering wheel inputs when transitioning from ahead thrust (Zone 4) to astern thrust (Zone 5).

FIGS. 13-17 contain example algorithms for Zones 1-5 respectively. Because the effects of the propeller thrust contribute to the net translation and rotational thrust in different ways depending on the direction of net translational thrust (zone), each zone has a dedicated algorithm such that the controller automatically updates the algorithm when transitioning from one zone to another. Each zone-specific algorithm contains a different mapping that relates the control devices (e.g., joystick and steering wheel) to the propulsion devices (e.g., steerable drive, transmission gear and associated trolling gear, engine RPM). For example, when thrusting ahead with no side thrust (Zone 4, FIG. 16), modules 1656 and 1657 turn the drives in the starboard direction when the helm is turned to starboard (CW). In contrast, when thrusting astern with no side thrust (Zone 5, FIG. 17), modules 1750 and 1751 turn both drives to port when the helm is turned to starboard (CW).

FIG. 5A contains a maneuvering diagram (or Net Thrust Diagram) that illustrates a plurality of thrust forces for a plurality of controller conditions, that are provided to a vessel configured with the herein described embodiment of a system and that is equipped with two steerable drives. For example, the resulting forces imparted to the vessel for a starboard turn when thrusting ahead is shown as maneuver C. In addition, the resulting forces imparted to the vessel where the steering wheel is turned to starboard and while the craft is reversing is shown as maneuver 0. By comparing maneuvers C and 0, one can see that in order to maintain a clockwise rotation (bow moving in the starboard direction) as commanded by the steering wheel (or steering tiller), the drives must be pointing in the starboard direction when thrusting ahead and in the port direction when thrusting astern.

Referring again to FIG. 5A, the response of a vessel configured according to the herein described embodiment of a system and equipped with dual steerable propellers to CCW rotations of the wheel or tiller is shown in maneuvers A (thrusting ahead) and M (thrusting astern), respectively. It is to be appreciated that the movements of the drives are similar to the CW turning maneuver; however, the drives turn in opposite directions, as shown in modules 1656 and 1657 for Zone 4 and modules 1750 and 1751 for Zone 5.

Figure 15:
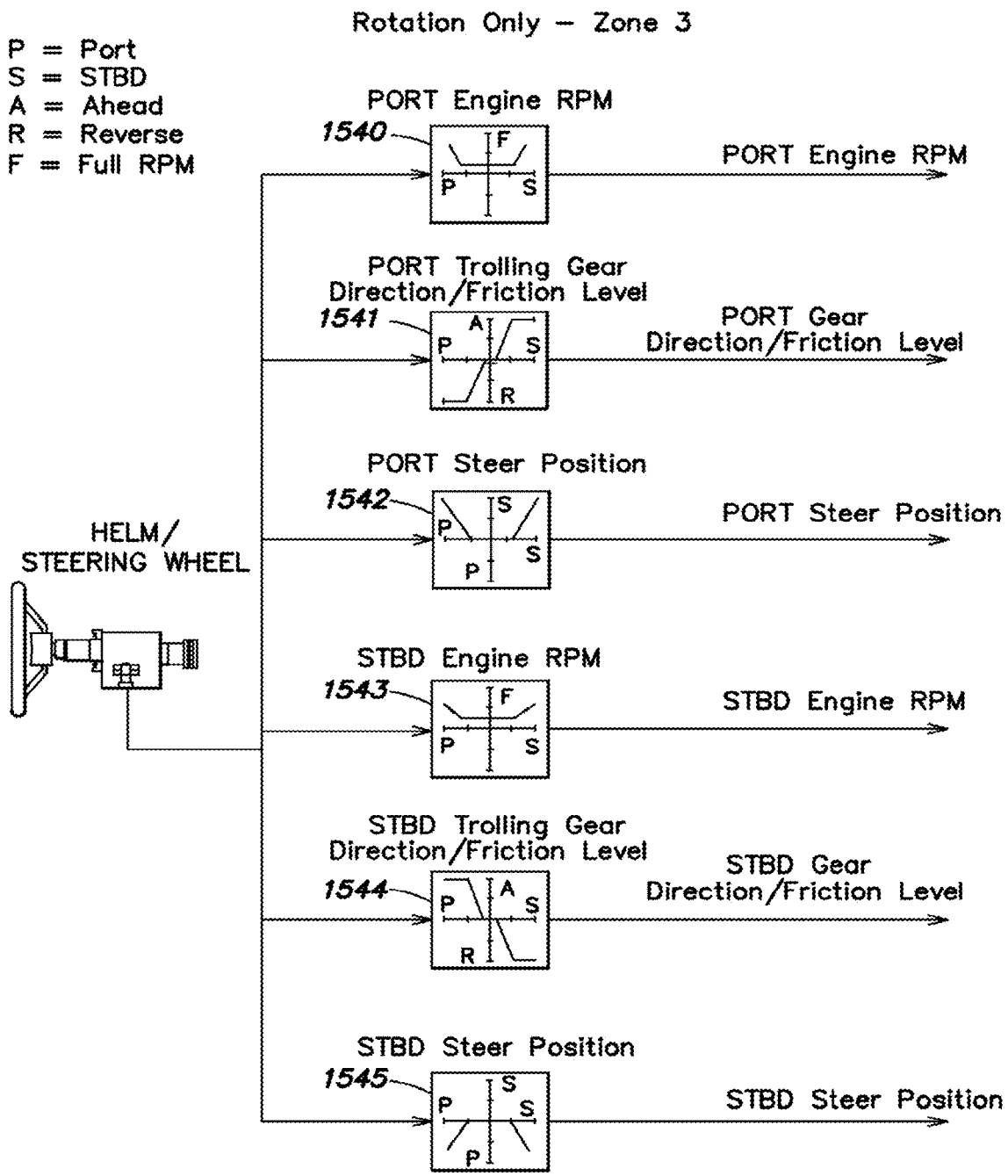
FIG. 15 illustrates an embodiment a control system and process for Zone 3 of the joystick controller of FIG. 12, which can be used with steerable propellers and a trolling gear.
Figure 16:
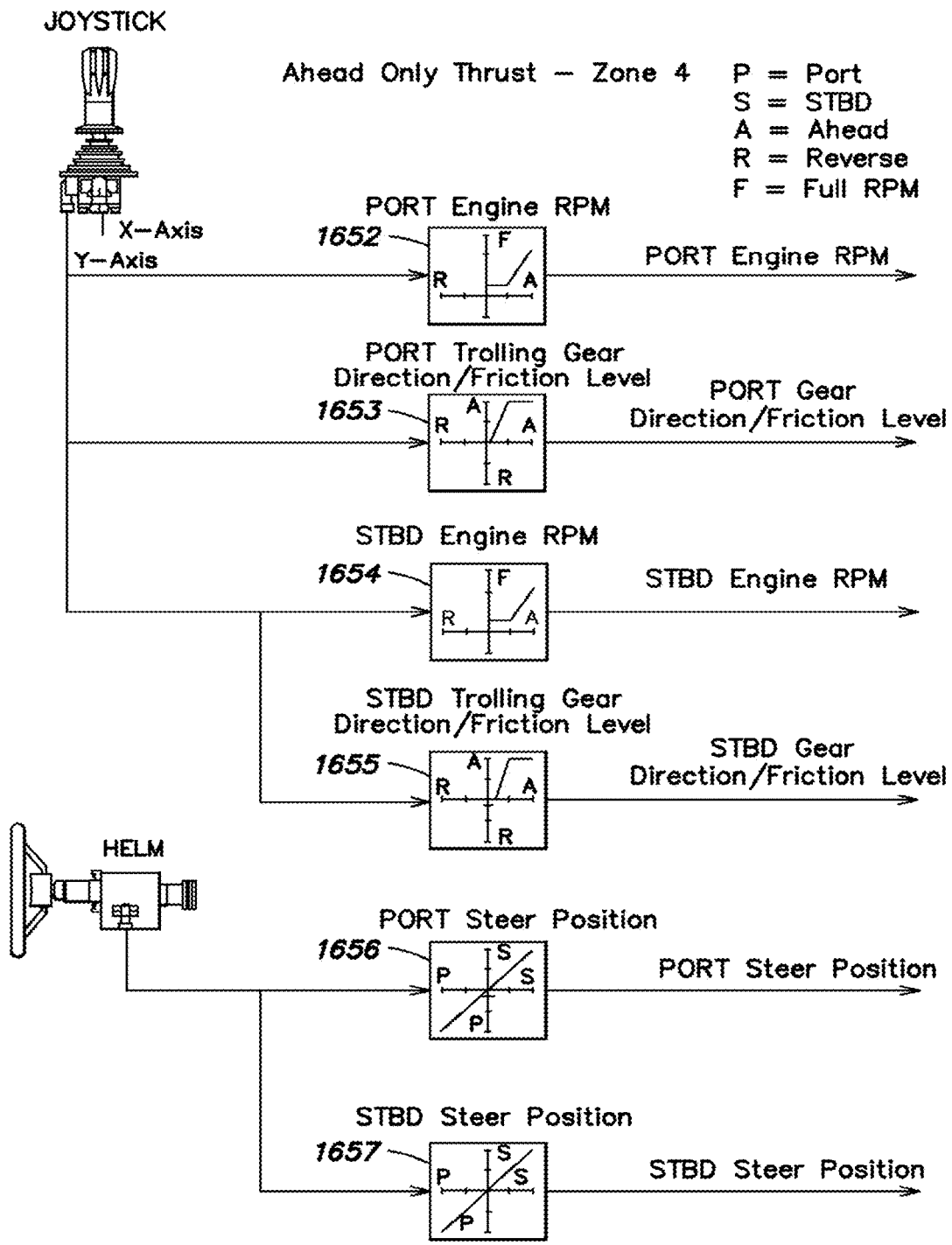
FIG. 16 illustrates an embodiment a control system and process for Zone 4 of the joystick controller of FIG. 12, which can be used with steerable propellers and a trolling gear.
Figure 17:
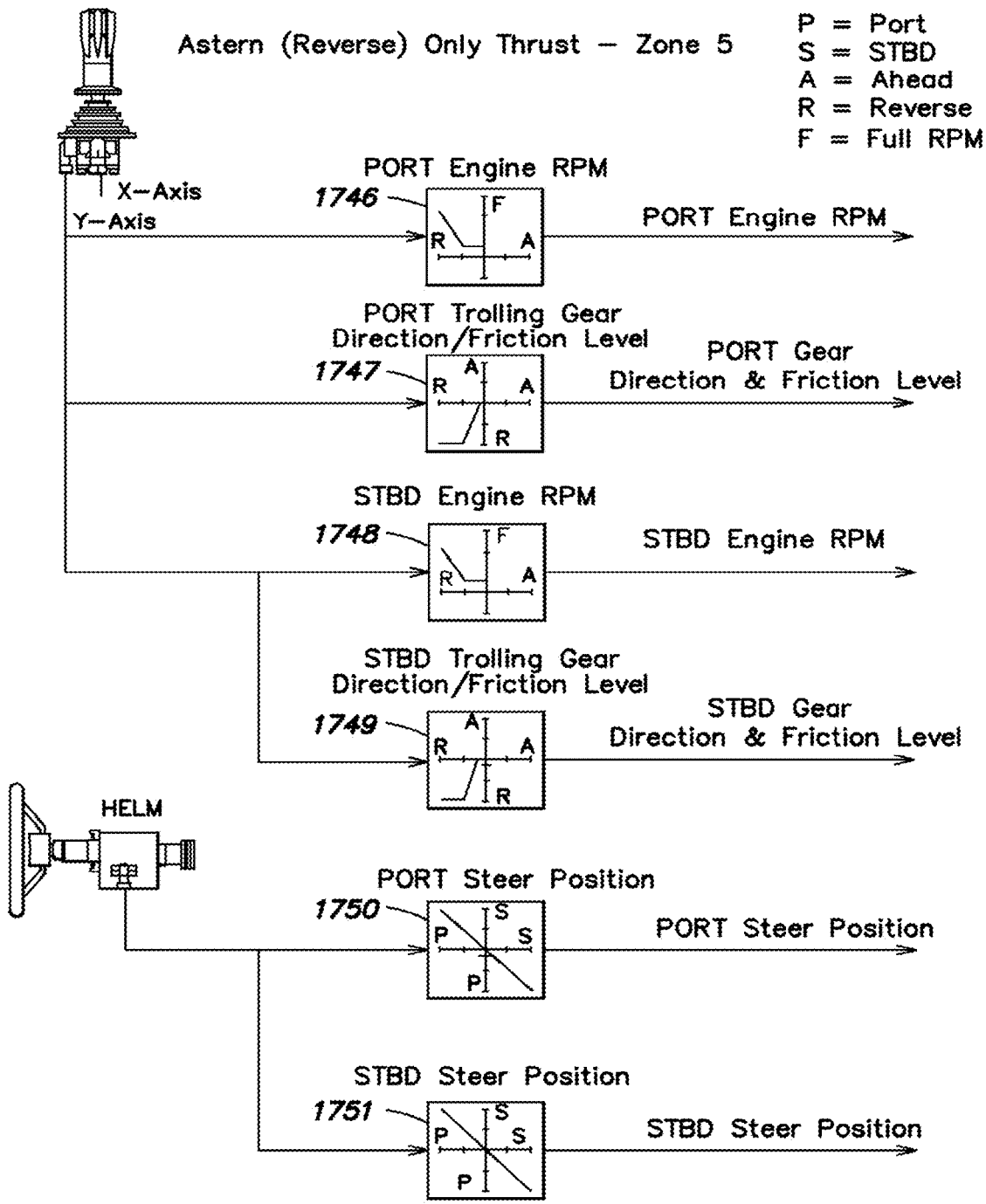
FIG. 17 illustrates an embodiment a control system and process for Zone 5 of the joystick controller of FIG. 12, which can be used with steerable propellers and a trolling gear.

Another example of control/propulsion device mapping to be considered is the case where there is no net translational thrust (i.e., only rotational thrust, Zone 3). A vessel equipped with dual steerable drives is not able to develop a turning moment by rotating the drives while at neutral thrust. Consequently, a special algorithm or mapping for the individual drives when no translational thrust is commanded such that the drives can operate independently to develop the turning moment. FIG. 15 shows a signal diagram for Zone 3 of the herein described embodiment of a system. It is to be appreciated that since the condition for Zone 3 is zero translational thrust, the joystick inputs have been omitted from the diagram for simplification.

To operate in Zone 3, a control scheme must be implemented where the drives are operated differentially, where one drive is generating ahead thrust and the other is generating astern thrust in order to impart little or no net translational thrust to the craft. FIG. 15 illustrates an effective method for developing rotational thrust with little or no translational thrust. Taking for example maneuver F shown in FIG. 5A, the wheel is turned to starboard while the joystick is centered. With a trolling gear on the transmission, Module 1541 (FIG. 15) progressively increases the port gear setting to achieve progressively increasing propeller speed in the ahead direction, while module 1544 progressively increases the starboard gear setting to achieve progressively increasing propeller speed in the astern direction creating a force couple (moment) without creating a substantial net translational thrust. Since the amount of turning force created by the differential thrust of the drives is limited while the drive steering positions are maintained in a parallel orientation at zero steer angle, additional turning of the wheel will progressively turn the port drive in the starboard direction (module 1542) and the starboard drive in the port direction (module 1545). Increasingly toeing-in (pointing) the drives will increase the moment arm of the resultant force created by the two drives significantly while applying a relatively small side force. In addition to actuating the propeller shaft speed differentially and toeing in the drives, modules 1540 and 1543 progressively increase engine RPM once the wheel or tiller is moved beyond a threshold point. Thus according to this embodiment of the system disclosed herein, the system provides rotation forces with little or no translation forces by progressively pointing in the steerable propellers and/or applying differential RPM to the drives as a function of wheel or tiller rotation. However, it is to be understood that the exact combination of trolling gear settings, steering angle movements, and engine RPM levels shown in the embodiment in FIG. 5A is not required to achieve the same or similar results. For example, the engine RPM can be increased at different points in the mapping or not at all with varying levels of effectiveness. In addition, the extent of toeing in to the drives can be changed or eliminated, also with varying levels of effectiveness.

Vessels equipped with steerable propellers are able to induce combinations of transverse and rotational thrusts that will allow the craft to translate sideways while at the same time apply varying amounts of rotational thrust. As another example, referring to Zone 1 (thrusting to port) in FIG. 5A, an example maneuver in which a transverse thrust is applied to the craft without a rotational thrust is identified as maneuver H. The required actuation of the trolling gear, steering angles and engine RPM to achieve maneuver H can be determined from the control diagram of FIG. 13.

Let us first consider the case of maneuver H where the craft is translating sideways with little or no forward or reverse thrust. In this case, the initial condition is maneuver E (Zone 3), in which the joystick is centered (neutral X and neutral Y) and the steering wheel is centered; in this condition, both transmissions will be set to neutral, in accordance with the signals created by the joystick and transmitted to modules 1300 and 1303. As the X-axis signal is increased beyond the threshold that transitions from Zone 3 to Zone 1, the port drive steering angle is positioned (by module 1302) in a discrete position in the port direction and the starboard steering angle is positioned (by module 1305) in a discrete position in the starboard direction. The respective positions of the port and starboard drives correspond to the equilibrium point where translational thrust can be applied in any direction without inducing a substantial rotational or yawing force. These positions usually correspond to angles where both drives are pointed along respective center lines that intersect at or near the center of rotation of the craft. Drives that are positioned in this manner are sometimes referred to as being in a toe out configuration. As long as the steering wheel remains in a neutral position that corresponds to no rotational thrust, both drives will remain in these respective discrete positions.

As illustrated by modules 1300 and 1301, progressively moving the joystick to increase the magnitude of net transverse thrust in the port direction will increase the trolling gear setting (increase in friction level) in the astern direction and increase the RPM of the port engine (not necessarily together), thereby increasing the reverse thrust of the port drive. At the same time, moving the joystick to port will increase the trolling gear setting in the ahead direction and increase the RPM of the starboard engine, thereby increasing the ahead thrust of the starboard drive. As long as the joystick is moved along the X-axis only (i.e., neutral Y position), the reversing thrust of the port drive and the ahead thrust of the starboard drive will remain substantially equal in magnitude so as to induce a net transverse thrust without imparting a net to forward or reverse thrust.

Adding a rotational thrust in the port or counter-clockwise direction (maneuver G of FIG. 5A) is achieved by rotating the steering wheel in the counter-clockwise direction. As indicated by modules 1310 and 1311, moving the steering wheel to port (CCW) will move the port drive in the starboard direction and the starboard drive in the port direction. This is achieved by creating an additional starboard movement with module 1310 for the port drive based on the magnitude of the wheel rotation and adding it to the discrete position output from module 1302 at summing module 1316. Similarly, an additional port movement is added to the starboard drive by module 1311 and summed with the discrete output of module 1305 at summing module 1317. So as not to create a situation where the drives are allowed to move to a point beyond the neutral position such that the direction of translational thrust differs substantially from the joystick movement, absolute limits are placed on the steering movements with module 1318 for the port drive and module 1319 for the starboard drive. Module 1318 will not allow the port drive to move to the starboard side of neutral (straight ahead) and module 1319 will not allow the starboard drive to move to the port side of neutral.

It is to be appreciated, however, that for cases in which there is not enough rotational thrust available in one direction as provided by the system described herein, the limits set by modules 1318 and 1319 can be extended.

It is to be understood that the magnitude of the steering angles of the port and starboard drives in response to steering wheel movements need not be the same, provided there are minimal changes in translational thrust resulting from movements of the steering wheel or tiller. The optimum amounts of steering angle movement for each drive in response to steering commands depends heavily on the hydrodynamics of the craft during side thrusting operations as well as the hull-propeller interactions for each drive. These points can be estimated with application-specific modeling or determined during a sea trial.

Figure 14:
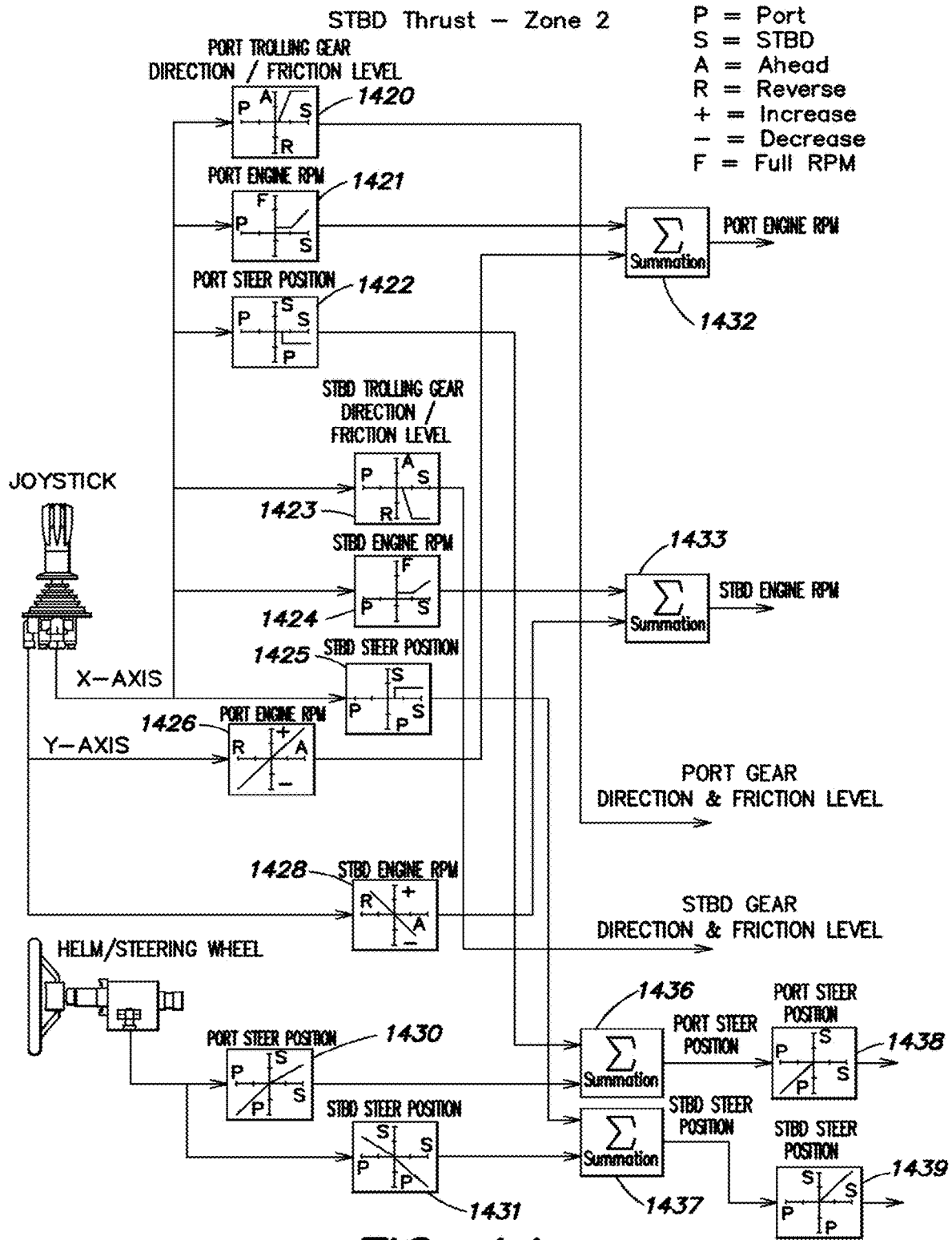
FIG. 14 illustrates an embodiment a control system and process for Zone 2 of the joystick controller of FIG. 12, which can be used with steerable propellers and a trolling gear.

It is understood that Zone 2 of FIG. 5A is substantially a minor image of Zone 1, and therefore the corresponding modules of FIG. 14 and the resulting maneuvers J, K and L illustrated in FIG. 5A will not be discussed in detail here, for the sake of brevity.

As shown in FIG. 12, Zones 1 and 2 cover all movements of the joystick to the respective side of neutral (with respect to transverse thrust). Accordingly, the control algorithms described in FIG. 13 for Zone 1 and FIG. 14 for Zone 2 also are configured to add varying levels of ahead and astern thrust in response to joystick movements along the Y axis in to order to respond to diagonal translational thrust commands from the joystick. For example, referring now to FIG. 5B, which illustrates movements of a vessel configured with the control system of one embodiment of the present application and equipped with dual steerable propellers, maneuver Q can be achieved by maintaining the steering wheel at a neutral position such that modules 1310 and 1311 (of FIG. 13) do not contribute additional steering movements to the summation modules (1316, 1317) and by moving the joystick forward in addition to the port direction. As the joystick is moved forward along the Y axis, module 1306 of FIG. 13 progressively decreases the port engine RPM and module 1308 progressively increases the starboard engine RPM, thereby decreasing the astern thrust of the port drive and increasing the ahead thrust of the starboard drive. This maneuver is illustrated as maneuver Q in FIG. 5B, by schematically indicating the reduction of thrust in the port drive and the increase in thrust of the starboard drive.

In a similar fashion as maneuvers G and I illustrated in FIG. 5B, a rotational thrust to port (CCW) can be added by turning the wheel counter clockwise, thereby moving the drives towards the center as shown in maneuver P of FIG. 5B. Similarly, a clockwise rotational thrust can be achieved by turning the wheel to starboard which will move the drives away from the center, as shown in maneuver R (FIG. 5B).

Like the forward diagonal movements of maneuvers Q and R in FIG. 5B, reverse diagonal thrust can be developed by moving the joystick backward along the Y axis. For example, by maintaining the steering wheel and moving the joystick backwards, module 1306 30 increases the astern thrust of the port drive and module 1308 decreases the ahead thrust of the starboard drive. This diagonal backwards and to port maneuver is illustrated as maneuver T of FIG. 5B. In a similar fashion as maneuvers G and I, a rotational thrust to port (CCW) can be added by turning the wheel counter clockwise, thereby moving the drives towards the center as shown in maneuver S of FIG. 5B. Similarly, a clockwise rotational thrust can be achieved by turning the wheel to starboard which will move the drives away from the center (i.e., drives splayed), as shown in maneuver U of FIG. 5B.

It is understood that Zone 2 of FIG. 5A is substantially a minor image of Zone 1, and therefore the corresponding modules of FIG. 14 will not be discussed in detail here for the sake of brevity.

It is to be understood that the summation modules herein described and illustrated can sum the various signals in different ways. For example, different signals may have different weights in the summation or selected signals may be left out of the summation under certain conditions. It is also the function of the summation module to clamp (limit) output signals that would otherwise exceed maximum values.

It is to be understood also that the port trolling gear module illustrated in FIGS. 13-17, according to the herein described embodiment of a system equipped with two steerable propellers, can be separated into two distinct modules to handle direction and friction level, respectively, for the port transmission. It is understood that the foregoing statement applies to the starboard trolling gear module.

As used herein, a propulsion device may be any suitable device configured to generate thrust to move a marine vessel. In some embodiments, a propulsion device may include one or more propellers (e.g., a single propeller drive or a dual propeller drive). In some embodiments, a propulsion device may include one or more waterjets. In some embodiments, a propulsion device may include one or more pumps. Examples of propulsion devices include, but are not limited to, outboard motors, inboard drives, outboard drives, stern drives, jet drives, and surface drives (e.g., Arneson drives). A marine vessel may comprise one or multiple propulsion devices.

The inventor has recognized that, in some instances, a control system for controlling one or more trimmable propulsion devices of a marine vessel may take into account the trim position(s) of the propulsion device(s) in order to more accurately control the devices in response to steering commands. For example, as described in more detail below, a control system may control a propulsion device of a marine vessel based, at least in part, on the trim position of the propulsion device when a steering actuator coupled to and configured to steer the propulsion device is attached to the marine vessel (e.g., attached to the transom of the marine vessel) at a point that is at a different height and/or a different fore-aft position than the trimming pivot point of the propulsion device.

Figure 18A:
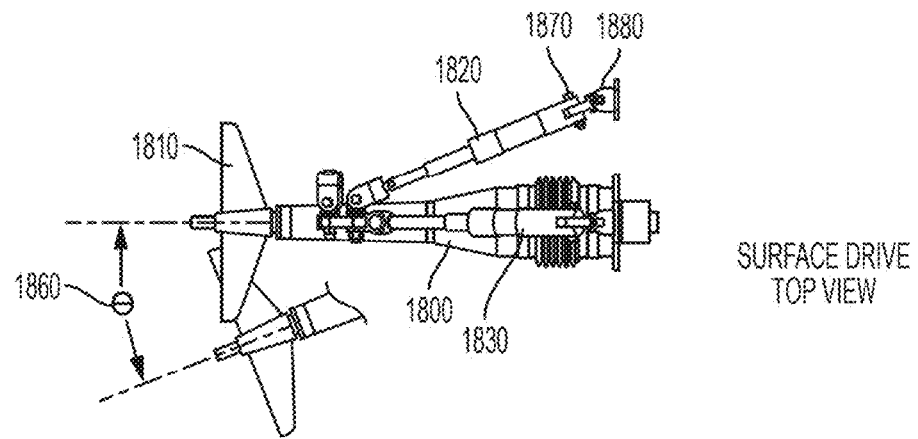
FIG. 18A shows a top view of a propulsion device connected to a steering actuator that is connected to a transom of a marine vessel at a position above the trimming pivot point of the propulsion device.
Figure 18B:
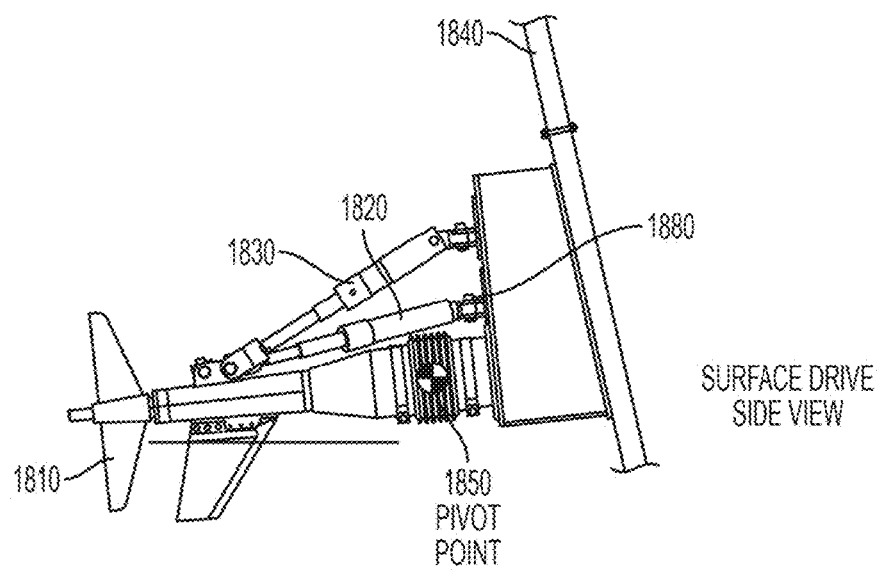
FIG. 18B shows a side view of the propulsion device of FIG. 18A.

FIGS. 18A and 18B illustrate a configuration of a trimmable propulsion device of a marine vessel in which control of the propulsion device may be improved when performed based, at least in part, on its trim position. FIGS. 18A and 18B show a top view and a side view of a propulsion device, respectively, which in this illustrative example is a surface drive 1800 having a propeller 1810. It should be appreciated, however, that the propulsion device shown in FIGS. 18A and 18B is not limited to being a surface drive and may be any other suitable type of propulsion device, examples of which are provided herein.

As shown in FIG. 18A, surface drive 1800 is coupled to steering actuator 1820 and trim actuator 1830. Steering actuator 1820 is configured to steer surface drive 1800 by extending or retracting. The degree of extension of a steering actuator is referred to herein as a steering actuator position. Trim actuator 1830 is configured to trim surface drive 1800 up or down about trimming pivot point 1850 by extending or retracting. The degree of extension of a trim actuator is referred to herein as a trim actuator position. The angle that a propulsion device makes with the major axis of the marine vessel is referred to as the steering angle of the propulsion device. For example, when the propulsion device is parallel to the major axis of the marine vessel, the steering angle of the propulsion device is zero degrees. As another example, as shown in FIG. 18A, when the steering actuator 1820 extends thereby moving surface drive 1800 away from a position parallel to the major axis of the marine vessel, the steering angle of surface drive 1800 is steering angle 1860.

It should be appreciated that, in some embodiments, when a marine vessel has multiple propulsion devices, each of the multiple propulsion devices may be controlled independently. Accordingly, in such embodiments, the steering actuators configured to steer respective propulsion devices may take on different steering actuator positions from one another, the steering angles of the propulsion devices may be different from one another, and/or the trim actuators configured to trim the propulsion devices may have different trim actuator positions from one another.

In some embodiments, when a steering actuator configured to steer a propulsion device of a marine vessel is attached to the transom of the marine vessel at one or more pivot points 1870 and 1880 that are at a different height and/or fore-aft position than that of the trimming pivot point of the propulsion device, trimming the propulsion device up or down while maintaining the steering angle of the propulsion device will require the steering actuator to retract or extend. If the steering actuator does not retract or extend to compensate for the change in trim position, the steering angle cannot be maintained. For example, as shown in FIGS. 18A and 18B, steering actuator 1820 is attached to the transom 1840 at pivot points 1870 and 1880 that are located above and further forward relative to the trimming pivot point 1850 of the surface drive 1800. If the surface drive 1800 is trimmed up (i.e., trimmed in the direction of being raised out of the water) through retraction of trim actuator 1830, and the steering angle of the surface drive 1800 is to be maintained, the steering actuator 1820 needs to retract since the point of connection of the steering actuator 1820 to the surface drive 1800 will be pulled closer to the position at which the steering actuator 1820 is attached to the transom 1840 in order to maintain the same steering angle. If the surface drive 1800 is trimmed down (i.e., in the direction of being lowered into the water) through extension of trim actuator 1830, and the steering angle of the surface drive 1800 is to be maintained, the steering actuator 1820 needs to extend since the point of connection of the steering actuator 1820 to the surface drive 1800 will be pushed farther from the position at which the steering actuator 1820 is attached to the transom 1840 in order to maintain the same steering angle. If the steering actuator does not extend or retract in response to changes in trim position, the steering angle will change when the trim position is changed.

When a steering actuator (e.g., steering actuator 1820) retracts or extends to accommodate a different trim position of the propulsion device to which it is coupled (e.g., surface drive 1800), the relationship between the extension position of the steering actuator and the steering angle at which the propulsion device is positioned depends on the trim position of the propulsion device. If not taken into account by a control system, this relationship may be problematic for at least one or more of the following three reasons.

1. When the steering angle of a propulsion device is determined by measuring the extension position of the steering actuator configured to steer the propulsion device (e.g., by a sensor configured to sense the extension position of the steering actuator), the measured extension position and, therefore, the measured sensor signal varies as a function of trim actuator position for the same steering angle of the propulsion device.

2. In a marine vessel having a plurality of propulsion devices, the trim actuator position and steering actuator position for each propulsion device may be controlled independently. Trimming one propulsion device up or down relative to another propulsion device requires one or both steering actuator positions to change relative to one another in order to maintain the same steering angles. When the propulsion devices are connected by a solid tie-bar, moving the propulsion devices to different trim positions without adjusting the steering actuator position can put a significant stress on the tie-bar, pulling the propulsion devices toward one another, and/or pushing the propulsion devices away from one another, potentially causing damage.

3. The allowable propulsion device steering arc varies depending on the trim position of the propulsion device. For example, when the steering actuator 1820 is extended to accommodate a particular trim position of surface drive 1800, full extension of the steering actuator 1820 produces a different steering angle range than would be the case when the steering actuator 1820 is not extended to accommodate the particular trim position of surface drive 1800. For example, as illustrated in FIG. 18B, the steering actuator 1820 needs to extend when the surface drive 1800 is trimmed down. When the surface drive 1820 is trimmed down and a steering command is received to turn the surface drive 1820 fully to starboard, the maximum amount that the surface drive 1800 can be turned (i.e., the maximum steering angle of the surface drive 1800) in that direction is limited by the range of extension of the steering actuator 1820. Since the steering actuator 1820 already needs to extend to accommodate the lowered trim position, the amount that it can extend further in response to a steering angle command is limited.

For at least these reasons, a control system for controlling one or more propulsion devices of a marine vessel may take into account the trim position(s) of the vessel's propulsion device(s) in order to more accurately and/or more safely control the marine vessel. Accordingly, some embodiments provide for a control system that takes the trim position of a propulsion device into account, when controlling the propulsion device, by using the trim position to adjust steering actuator commands provided for controlling a propulsion device, thereby generating corrected steering actuator commands in order to achieve a corrected propulsion device steering angle(s).

As used herein, the term "corrected" when used to describe a steering angle or command may refer to either the correct, actual steering angle or command, or a more accurate steering angle or command that has been corrected in accordance with the techniques described herein.

Described herein are techniques, developed by the inventor, for compensating for the trim position of one or more propulsion devices of a marine vessel. In some embodiments, the system includes circuitry that is configured to compensate for the trim position of a propulsion device by using the trim position of the propulsion device to adjust steering actuator commands provided to the propulsion device. In some embodiments, the circuitry may be configured to receive a steering angle command for a propulsion device and a trim position (e.g., a measured/estimated or commanded trim position) of the propulsion device, and generate a corrected steering actuator position command for the propulsion device based on the received steering angle command and the received trim position. The circuitry may cause the propulsion device to be positioned in accordance with the corrected steering actuator position command (e.g., by causing the steering actuator coupled to the propulsion device to extend or retract in accordance with the corrected steering actuator position command). In other embodiments, a separate system or apparatus may be used to position the steering actuator in response to receiving the corrected steering actuator position command.

In some embodiments, the circuitry may be configured to generate the corrected steering actuator position command by: (1) identifying, based on the trim position of the propulsion device, a mapping encoding a determined relationship between steering angle commands and corresponding corrected steering actuator position commands; and (2) using the identified mapping to generate the corrected steering actuator position command from the steering angle command. For example, in some embodiments, the circuitry may be configured to access a memory storing a plurality of mappings corresponding to a respective plurality of trim positions, each of the plurality of mappings encoding a determined relationship between steering angle commands and corresponding corrected steering actuator position commands. In such embodiments, the circuitry may be configured to generate the corrected steering actuator position command by: (1) identifying, based on the trim position of the propulsion device, a mapping in the plurality of mappings; and using the identified mapping to generate the corrected steering actuator position command from the steering angle command. The mapping may be implemented as one or more look up tables, one or more parameters, one or more functions that may be evaluated, one or more curves, or in any other suitable way, as aspects of the technology described herein are not limited in this respect. In some embodiments, the circuitry may be configured to calculate a corrected steering actuator position command for a steering angle command for a propulsion device based on the trim position of the propulsion device and the steering angle command for the propulsion device.

Figure 19:
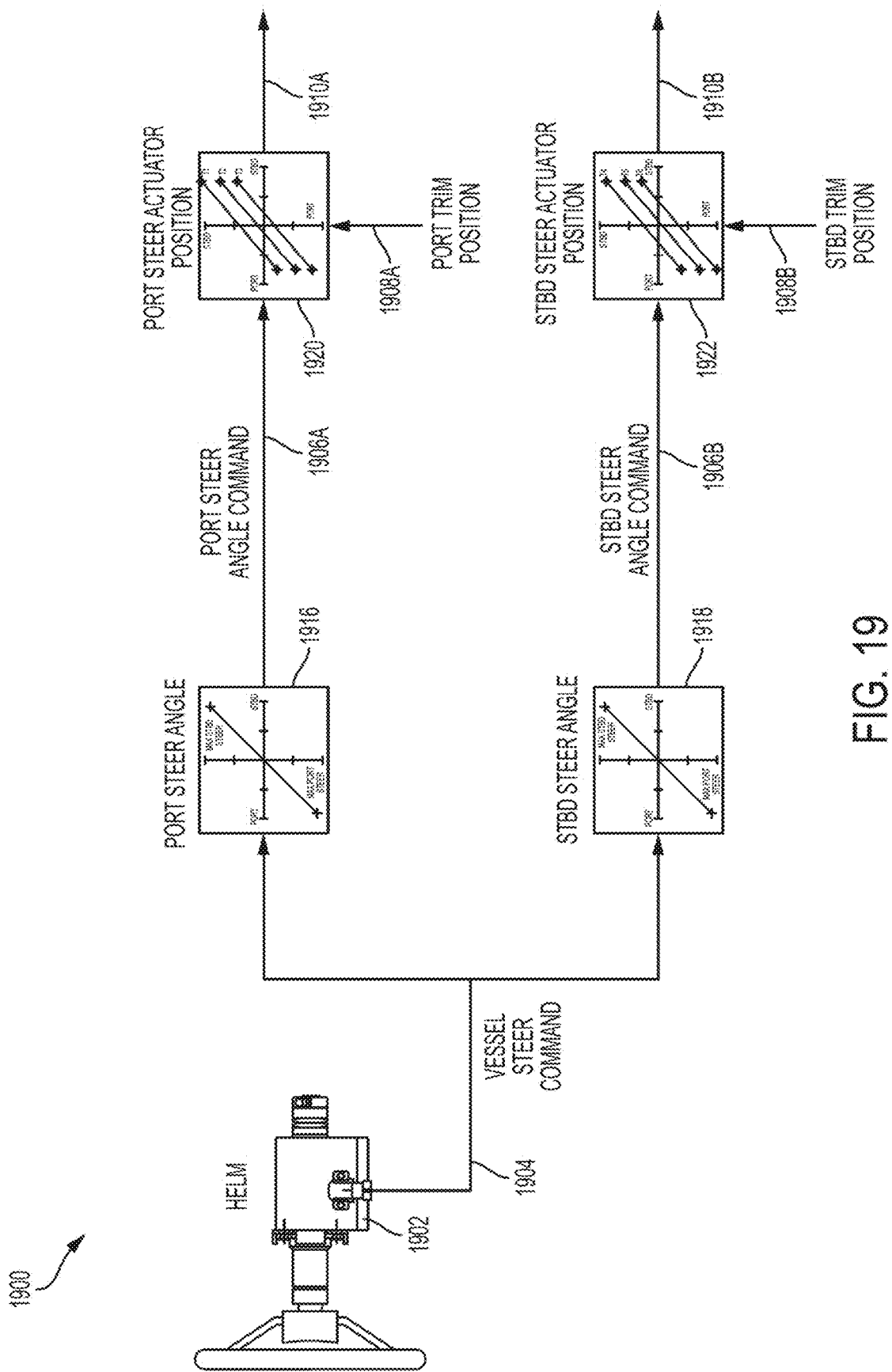
FIG. 19 illustrates a control system configured to control propulsion devices of a marine vessel based, at least in part, on respective trim positions of the propulsion devices.

FIG. 19 illustrates a control system 1900 configured to control propulsion devices of a marine vessel based, at least in part, on respective trim positions of the propulsion devices. Control system 1900 is configured to control port and starboard propulsion devices independently. Control system 1900 includes logic modules 1916, 1918, 1920, and 1922 that together are configured to produce a corrected port steering actuator position command 1910a and a corrected starboard steering actuator position command 1910b in response to a vessel steering command 1904 provided (directly or indirectly) in response to movement of a helm 1902 or any other suitable vessel control apparatus (e.g., joystick, tiller, etc.). Each of the logic modules of control system 1900 (as well as the logic modules described below with reference to FIGS. 20, 21A, and 21B) may be implemented by any suitable circuitry, such as logic elements and/or a controller (e.g., a microprocessor), for example.

As shown in FIG. 19, control system 1900 comprises logic module 1916 configured to receive vessel steering command 1904 and produce a steering command for the port propulsion device of the marine vessel—port steering angle command 1906a. Control system 1900 also comprises logic module 1918 configured to receive vessel steering command 1904 and produce a steering command for the starboard propulsion device of the marine vessel—starboard steering angle command 1906b. The commands 1906a and 1906b are generated without taking into account the trim positions of the port and starboard propulsion devices, respectively. In order to generate steering actuator commands corrected for the trim position of the port and starboard propulsion devices based on steering angle commands 1906a and 1906b, control system 1900 comprises logic modules 1920 and 1922. Logic module 1920 is configured to receive port steering angle command 1906a and port trim position 1908a, which indicates the trim position of the port propulsion device, and generate a steering actuator command corrected for the trim position of the port propulsion device—corrected port steering actuator position command 1910a. Logic module 1922 is configured to receive starboard steering angle command 1906b and starboard trim position 1908b, which indicates the trim position of the starboard propulsion device, and generate a steering actuator command corrected for the trim position of the starboard propulsion device—corrected starboard steering actuator position command 1910b.

In some embodiments, the trim position of a propulsion device may be determined based on one or more output(s) produced by a sensor configured to sense the trim position of the propulsion device. The sensor may be configured to sense the trim actuator position of the trim actuator coupled to the propulsion device. The sensor may be integrated with the trim actuator or propulsion device, included in the trim actuator or propulsion device, coupled to the trim actuator or propulsion device, and/or configured to sense the trim position of the propulsion device in any other suitable way. For example, the trim position of steering drive 1800 may be sensed by a sensor integrated with, included in, and/or coupled to trim actuator 1830. Accordingly, in some embodiments, port trim position 1908a may be obtained from a sensor configured to sense the trim actuator position of the trim actuator coupled to the port propulsion device, and starboard trim position 1908b may be obtained from a sensor configured to sense the trim actuator position of the trim actuator coupled to the starboard propulsion device. However, the trim position of a propulsion device may be determined in any other suitable way and, in some embodiments, may be determined based on a trim actuator position control signal for the trim actuator of a propulsion device. For example, such a trim actuator position control signal may be provided by a trim control apparatus (e.g., a trim control knob, a joystick, etc.) in response to movement of the trim control apparatus by an operator of the marine vessel. Accordingly, trim positions 1908a and 1908b may be determined based on respective trim actuator control signals, in some embodiments.

As described above, logic module 1920 may be configured to generate corrected port steering actuator position command 1910a based on port steering angle command 1906a and port trim position 1908a. In some embodiments, the logic module 1920 may be configured to: (1) use port trim position 1908*a* to identify a mapping representing a determined relationship between received port steering angle commands and corrected port steering actuator position commands; and (2) use the identified mapping to obtain corrected port steering actuator position command 1910*a* based on port steering angle command 1906*a*. The identified mapping may be implemented as one or more look up tables, one or more parameters, one or more functions that may be evaluated, one or more curves, or in any other suitable way, as aspects of the technology described herein are not limited in this respect.

In some embodiments, logic module 1920 may be configured to access a plurality of mappings stored in a memory and identify a mapping (from the plurality of mappings) to use for generating the corrected port steering actuator command 1910*a* based on port trim position 1908*a*. For example, as shown in FIG. 19, logic module 1920 is configured to access three mappings represented by curves T1, T2, and T3 plotted within logic module 1920, each of these curves corresponding to a respective port trim actuator position. It should be appreciated that logic module 1920 is not limited to using three mappings, which are shown for clarity, and may be configured to use any suitable number of mappings. Moreover, in some embodiments, logic module 1920 may be configured to interpolate among stored mappings to obtain an interpolated mapping (e.g., as an affine combination of one or more stored mappings) for a particular input trim position of the port propulsion device.

In the plot shown within the logic module 1920, the steering angle command received as input to the logic module 1920 is shown on the X-axis and the corrected steering actuator position command is shown on the Y-axis. The logic module 1920 determines the corrected steering actuator position command 1910*a* based on the identified mapping (e.g., the identified curve) and sends the corrected port steering actuator position command 1910*a* to additional circuitry and/or device(s) responsible for positioning the port propulsion device. The steering actuator position command to the port propulsion device is thereby corrected for the trim position of the port propulsion device. The corrected port steering actuator position command 1910*a* can be provided as an actuator control signal to separate control logic and/or circuitry responsible for positioning the port steering actuator such as a feedback or full follow-up control loop or system that may or may not include sensors mounted on or to the steering actuators, in some embodiments. The techniques described herein are not limited to the particular circuitry (e.g., logic, a processor, a controller, etc.) used to implement this functionality, as those of ordinary skill in the art will appreciate that such circuitry may be implemented in a variety of ways.

Similarly, logic module 1922 may be configured to generate corrected starboard steering actuator position command 1910*b* based on port steering angle command 1906*b* and port trim position 1908*b*. In some embodiments, the logic module 1922 may be configured to: (1) use port trim position 1908*b* to identify a mapping representing a determined relationship between received starboard steering angle commands and corrected starboard steering actuator position commands; and (2) use the identified mapping to obtain corrected starboard steering actuator position command 1910*b* based on starboard steering angle command 1906*b*.

In some embodiments, logic module 1922 may be configured to access a plurality of mappings stored in a memory and identify a mapping (from the plurality of mappings) to use for generating the corrected starboard steering actuator command 1910*b* based on starboard trim position 1908*b*. For example, logic module 1922 is configured to access three mappings represented by curves T4, T5, and T6 plotted within logic module 1922, each of these curves corresponding to a respective starboard trim actuator position. It should be appreciated that, when the trim positions of the port and starboard propulsion devices are the same, the mappings used by logic modules 1920 and 1922 may be the same or different, as aspects of the technology described herein are not limited in this respect. Like logic module 1920, logic module 1922 is not limited to using three mappings and may be configured to use any suitable number of mappings. Logic module 1922 may be configured to interpolate among stored mappings to obtain an interpolated mapping for a particular input trim position of the starboard propulsion device.

In the plot shown within the logic module 1922, the steering angle command received as input to the logic module 1922 is shown on the X-axis and the corrected steering actuator position command is shown on the Y-axis. The logic module 1922 determines the corrected starboard steering actuator position command 1910*b* based on the identified mapping (e.g., the identified curve) and sends the corrected starboard steering actuator position command 1910*b* to the control logic, circuitry and/or device(s) responsible for positioning the starboard propulsion device. The steering actuator position command to the starboard propulsion device is thereby corrected for the trim position of the starboard propulsion device. The corrected starboard steering actuator position command 1910*b* may be provided as an actuator control signal to separate control logic and/or circuits responsible for positioning the starboard steering actuator such as a feedback or full follow-up control loop or system that may or may not include sensors mounted on or to the steering actuators, in some embodiments. It should be appreciated that although the mappings illustrated in FIG. 19 are shown using straight lines in FIG. 19, mappings used by logic modules 1920 and 1922 are not limited to being linear mappings—any suitable mapping may be used.

In some embodiments, a control system that takes trim position into account may be used to control the steering actuator position of each drive based on the trim position of both port and starboard drives. This could be particularly useful to minimize stress on a solid tie-bar when the drives are trimmed differentially. If one drive is trimmed relative to the other, the control system may adjust the steering actuator position of both drives such that substantially the same net yawing force is maintained but the drives are moved closer or further apart to accommodate the tie-bar movement resulting from trimming the one or both drives differentially. Such functionality may be implemented in the system described in FIG. 19, for example, by inputting the Starboard Trim Position signal 1908*b* to Port Steer Actuator Position Module 1920 and inputting the Port Trim Position signal 1908*a* to Starboard Steer Actuator Position Module 1922. Modules 1920 and 1922 may incorporate a mapping method such as curves, parameters, equations, or functions that will adjust Port and Starboard Steer Actuator Position Commands 1910*a* and 1910*b* in order to accommodate the mechanical constraints imposed by the tie-bar.

It should be appreciated that aspects of the technology described herein are not limited to the control system 1900 described with reference to FIG. 19, and that any control system for controlling one or more propulsion devices of a marine vessel may be modified to take trim position(s) of the propulsion device(s) into account when controlling the propulsion device(s). For example, trim position(s) of the propulsion devices may be taken into account for a vessel that has a control system configured to control the vessel to perform rotation without translation, translation without rotation, or both rotation and translation, by way of example.

Figure 20:
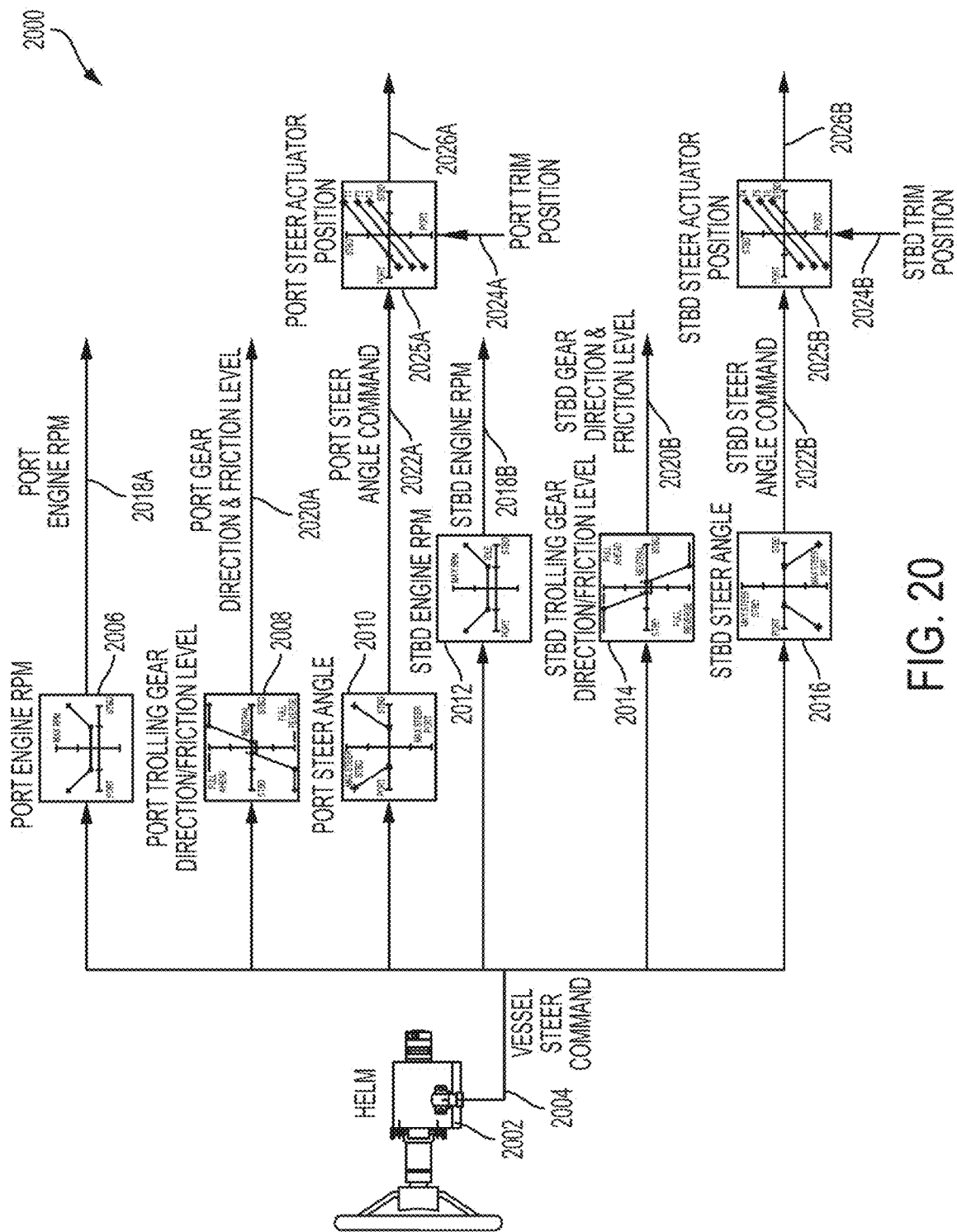
FIG. 20 illustrates another control system configured to control propulsion devices of a marine vessel based, at least in part, on respective trim positions of the propulsion devices.

FIG. 20 shows another non-limiting example of a control system 2000 configured to control propulsion devices of a marine vessel based, at least in part, on respective trim positions of the propulsion devices. In particular, FIG. 20 illustrates a Zone 3 (rotation without translation) steering control system, modified from the Zone 3 steering control system shown in FIG. 15 through the introduction of logic modules 2025a and 2025b. Logic modules 2025a and 2025b are configured to adjust the steering actuator position commands for port and starboard propulsion devices of a marine vessel for a given steering angle command based on trim position(s) of the propulsion device(s). Although Zone 3 (rotation without translation) control logic is illustrated in FIG. 20, the techniques described herein are not limited to Zone 3 (rotation without translation) control logic and, as described above, the trim position may be taken into account for any steering control logic, algorithms, or system (e.g., a control logic or algorithms configured to control the vessel to perform translation without rotation, rotation without translation, or both rotation and translation).

Control system 2000 comprises logic modules 2006, 2008, 2010, 2012, 2014, 2016, 2025a and 2025b that are configured to control the rotations per minute (RPM), gear direction, and steering angles of the port and starboard propulsion devices. Each of the logic modules of control system 2000 may be implemented by any suitable circuitry, such as a controller (e.g., a microprocessor), for example.

As shown in FIG. 20, logic module 2006 is configured to produce port engine RPM command 2018a in response to a vessel steering command 2004 provided (directly or indirectly) in response to movement of a helm 2002 or any other suitable vessel control apparatus (e.g., joystick, tiller, etc.). Logic module 2012 is configured to produce starboard engine RPM command 2018b in response to vessel steering command 2004. Logic modules 2006 and 2012 may operate as the logic modules 1540 and 1543 (described above with reference to FIG. 15) operate. Logic module 2008 is configured to produce port gear direction and friction level command 2020a in response to vessel steering command 2004. Logic module 2014 is configured to produce starboard gear direction and friction level command 2020b in response to vessel steering command 2004. Logic modules 2008 and 2014 may operate as the logic modules 1541 and 1544 (described above with reference to FIG. 15) operate.

Logic module 2010 is configured to receive vessel steering command 2004 and produce a steering command for the port propulsion device of the marine vessel—port steering angle command 2022a. Logic module 2016 is configured to receive vessel steering command 2004 and produce a steering command for the starboard propulsion device of the marine vessel—starboard steering angle command 2022b. Logic modules 2010 and 2016 may be configured to operate as the logic modules 1542 and 1545 (described above with reference to FIG. 15) operate.

Logic modules 2010 and 2016 generate commands 2022a and 2022b without taking into account the trim positions of the port and starboard propulsion devices, respectively. In order to account for the trim positions of the propulsion devices, control system 2000 includes logic modules 2025a and 2025b. Logic module 2025a is configured to receive port steering angle command 2022a and port trim position 2024a, which indicates the trim position of the port propulsion device, and generate a steering actuator command corrected for the trim position of the port propulsion device—corrected port steering actuator position command 2026a. Logic module 2025b is configured to receive starboard steering angle command 2022b and port trim position 2024b, which indicates the trim position of the starboard propulsion device, and generate a steering actuator command corrected for the trim position of the starboard propulsion device—corrected starboard steering actuator position command 2026b. Logic modules 2025a and 2025b may operate in any suitable way including any of the ways described above with reference to logic modules 1920 and 1922 shown in FIG. 19.

As described above, when the steering angle of a propulsion device is determined by sensing the extension position of a steering actuator configured to steer the propulsion device (e.g., by using a sensor configured to sense the extension position of the steering actuator), the sensed position varies in dependence on the trim position of the propulsion device for the same steering angle. Accordingly, some embodiments provide for correcting the steering actuator position sensed from a steering actuator coupled to a propulsion device based on the trim position of the propulsion device, in order to obtain an accurate measurement of the steering angle of the propulsion device and/or of the position of the steering actuator.

In some embodiments, circuitry may receive the steering actuator position of a steering actuator or mechanical linkage coupled to a propulsion device and the trim position of the propulsion device, and may determine a corrected steering angle of the propulsion device based on the steering actuator or linkage position and the trim position. The circuitry may be part of a control system for controlling one or more propulsion devices of a marine vessel, part of an indication system configured to provide information to operators of the marine vessel, and/or part of any other system of a marine vessel.

In some embodiments, the circuitry may determine the corrected steering angle based on a trim position dependent mapping encoding a determined relationship (which may be stored in a memory or calculated in real-time) between steering actuator positions and steering angles. For example, the circuitry may be configured to determine the corrected steering angle of a propulsion device by: (1) identifying, based on the trim position of the propulsion device, a mapping encoding a determined relationship between steering actuator positions and corresponding corrected steering angles; and (2) using the identified mapping to determine the corrected steering angle based on the received (e.g., sensed) steering actuator position. In some embodiments, the circuitry may be configured to access a memory storing a plurality of mappings corresponding to a respective plurality of trim positions, each of the plurality of mappings encoding a determined relationship between steering actuator positions and corresponding corrected steering angles. In such embodiments, the circuitry may be configured to determine the corrected steering angle by: (1) identifying, based on the trim position of the propulsion device, a mapping in the plurality of mappings; and using the identified mapping to generate the corrected steering angle from the steering actuator position. The mapping may be implemented as one or more look up tables, one or more parameter values, one or more functions that may be evaluated, one or more curves, or in any other suitable way, as aspects of the technology described herein are not limited in this respect.

Figure 21A:
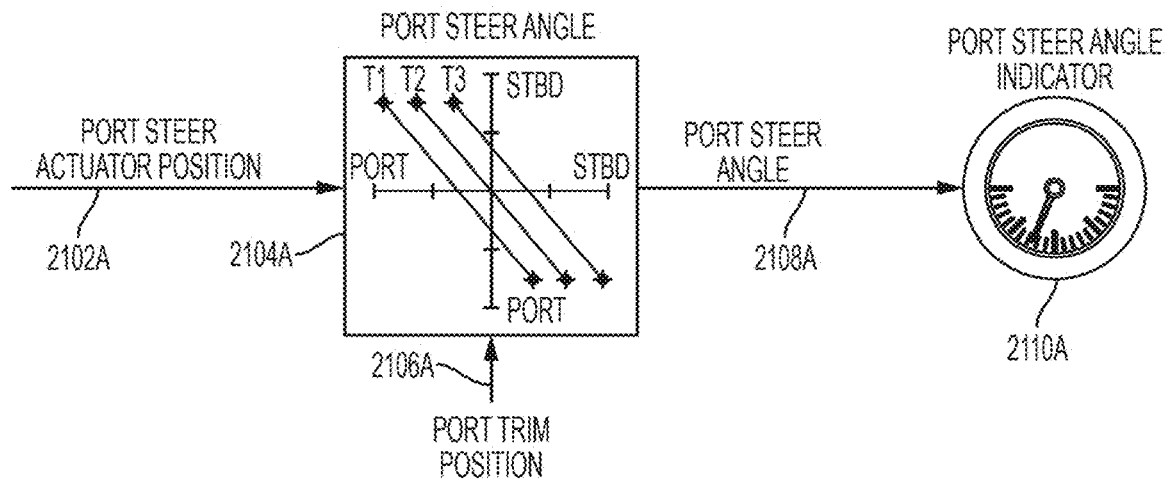
FIGS. 21A and 21B illustrate an indication system configured to provide indication of steering angles of propulsion devices to an operator of a marine vessel.
Figure 21B:
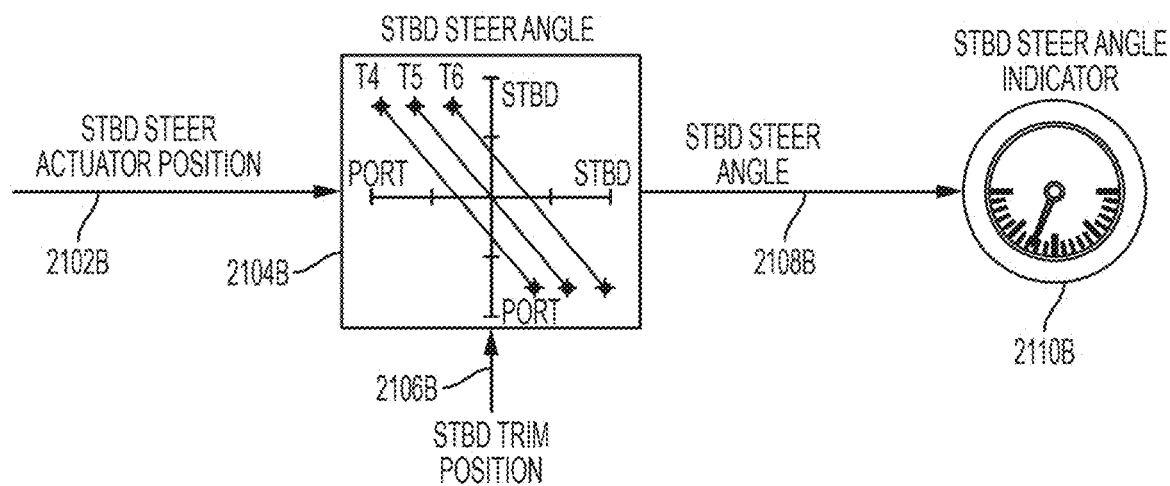

The corrected steering angle may be used in a variety of ways. In some embodiments, the corrected steering angle may be used to control steering of the marine vessel. For example, the corrected steering angle of a propulsion device may be provided as a feedback signal to a steering control system. In some embodiments, the corrected steering angle may be displayed to an operator of the vessel. For example, the corrected steering angle may be used in an indication system of a marine vessel, which may be part of or separate from the vessel's control system, to display a steering angle or steering position of the propulsion device that is equal to or closer to the actual steering angle or position of the propulsion device. The indication system may be any suitable type of indication system configured to provide an operator of the marine vessel (e.g., the driver) this information, such as a gauge or any other type of display (e.g., a digital or analog display). One example of such an indication system is shown in FIGS. 21A-B, described below. In yet other embodiments, the corrected steering angle signal may be provided as an input to other systems on or off of the craft. In some embodiments, the steering commands and/or trim commands can be produced by software, hardware and/or firmware running a program enables controlling the marine vessel. Such a program may run on device(s) on the marine vessel itself or at a remote location (e.g., in a server or other computing device such as a personal computer, tablet computer, or other computing device). If the marine vessel is controlled by an human operator, the operator may be present in the vessel or at another location (e.g., a remote location). The operator may control the marine vessel by operating any suitable input device, such as a joystick, helm, or computing device (e.g., personal computer, tablet computer, or other device). In some embodiments, marine vessel may be autonomous, and the steering commands and/or trim commands may be produced by software, hardware and/or firmware running a program enables controlling the marine vessel autonomously.

FIGS. 21A and 21B illustrate an indicator system 2100 configured to provide indications of steering angles of port and starboard propulsion devices to an operator of a marine vessel. The portion of the indicator system illustrated in FIG. 21A includes logic module 2104a configured to receive port steering actuator position 2102a and port trim position 2106a, and determine a corrected port steering angle 2108a based on the port steering actuator position 2102a and the port trim position 2106a. The determined port steering angle 2108a is then provided to port steering angle indicator 2110a, which may be configured to provide an indication of the corrected steering angle of the port propulsion device to an operator of the marine vessel. The portion of the indicator system illustrated in FIG. 21B includes logic module 2104b configured to receive starboard steering actuator position 2102b and starboard trim position 2106b, and determine a corrected starboard steering angle 2108b based on the starboard steering actuator position 2102b and the starboard trim position 2106b. The determined starboard steering angle 2108b is then provided to starboard steering angle indicator 2110b, which may be configured to provide an indication of the corrected steering angle of the starboard propulsion device to an operator of the marine vessel.

In some embodiments, port steering actuator position 2102a may be sensed by a sensor configured to sense the position of the port steering actuator. The sensor may be integrated with the port steering actuator, included in the port steering actuator, coupled to the port steering actuator, and/or configured to sense the position of the port steering actuator in any other suitable way. Similarly, starboard steering actuator position 2102b may be sensed by a sensor configured to sense the position of the starboard steering actuator. The sensor may be integrated with the starboard steering actuator, included in the starboard steering actuator, coupled to the starboard steering actuator, and/or configured to sense the position of the starboard steering actuator in any other suitable way.

In some embodiments, the port trim position 2106a may be sensed by a sensor configured to sense the trim position of the port drive. The sensor may be integrated with the port trim actuator or drive, included in the port trim actuator or drive, coupled to the trim actuator or drive, and/or configured to sense the trim position of the port drive in any other suitable way. Similarly, the starboard trim position 2106b may be sensed by a sensor configured to sense the trim position of the starboard propulsion device. The sensor may be integrated with the starboard trim actuator or propulsion device, included in the starboard trim actuator or propulsion device, coupled to the starboard trim actuator or propulsion device, and/or configured to sense the trim position of the starboard propulsion device in any other suitable way. As described above, in some embodiments, the port and/or starboard trim positions may be determined based on a trim actuator position control signal.

As described above, logic module 2104a may be configured to generate a corrected port steering angle 2108a based on port steering actuator position 2102a and port trim position 2106a. In some embodiments, the logic module 2104a may be configured to: (1) use port trim position 2106a to identify a mapping representing a determined relationship between received (e.g., sensed) steering actuator positions and steering angles; and (2) use the identified mapping to obtain a corrected port steering angle 2108a based on port steering actuator position 2102a. The identified mapping may be implemented as one or more look up tables, one or more parameters, one or more functions that may be evaluated, one or more curves, or in any other suitable way, as aspects of the technology described herein are not limited in this respect.

In some embodiments, logic module 2104a may be configured to access a plurality of mappings stored in a memory and identify a mapping (from the plurality of mappings) to use for determining the port steering angle 2108a based on port trim position 2106a. For example, as shown in FIG. 21A, logic module 2104a is configured to access three mappings represented by the curves plotted within logic module 2104a, each of these curves corresponding to a respective port trim actuator position. In the plot shown within the logic module 2104a, the steering actuator position received as input to the logic module 2104a is shown on the X-axis and the corrected steering angle is shown on the Y-axis. It should be appreciated that logic module 2104a is not limited to using three mappings and may be configured to use any suitable number of mappings. In some embodiments, logic module 2104a may be configured to interpolate among stored mappings to obtain an interpolated mapping for a particular port trim position. In other embodiments, the relationship between the sensed or measured actuator position and steering angle may be calculated based on trim position of the propulsion device.

Similarly, logic module 2104b may be configured to generate a corrected starboard steering angle 2108b based on starboard steering actuator position 2102b and starboard trim position 2106b. In some embodiments, the logic module 2104b may be configured to: (1) use starboard trim position 2106b to identify a mapping representing a determined relationship between received (e.g., sensed) steering actuator positions corrected steering angles; and (2) use the identified mapping to obtain corrected starboard steering angle 2108b based on starboard steering actuator position 2102b. The identified mapping may be implemented as one or more look up tables, one or more parameters, one or more functions that may be evaluated, one or more curves, or in any other suitable way, as aspects of the technology described herein are not limited in this respect.

In some embodiments, logic module 2104b may be configured to access a plurality of mappings stored in a memory and identify a mapping (from the plurality of mappings) to use for determining the starboard steering angle 2108b based on starboard trim position 2104b. For example, as shown in FIG. 21B, logic module 2104b is configured to access three mappings represented by the curves plotted within logic module 2104b, each of these curves corresponding to a respective starboard trim actuator position. In the plot shown within the logic module 2104b, the steering actuator position received as input to the logic module 2104b is shown on the X-axis and the corrected steering angle is shown on the Y-axis. It should be appreciated that logic module 2104b is not limited to using three mappings and may be configured to use any suitable number of mappings. In some embodiments, logic module 2104b may be configured to interpolate among stored mappings to obtain an interpolated mapping for a particular starboard trim position.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Having described various embodiments of a marine vessel control system and method herein, it is to be appreciated that the concepts presented herein may be extended to systems having any number or type of actuators and propulsion devices and is not limited to the embodiments presented herein. Modifications and changes will occur to those skilled in the art and are meant to be encompassed by the scope of the present description.

The invention claimed is:

1. A system for a marine vessel, the marine vessel having a steering actuator coupled to a propulsion device and a trim actuator coupled to the propulsion device, the trim actuator having a trim actuator position, the system comprising:
   at least one processor configured to be coupled to a trim position sensor, the at least one processor being configured to:
      receive a steering angle command for the propulsion device;
      receive a sensed trim actuator position from the trim position sensor, wherein movement of the trim actuator position while maintaining a constant steering actuator position changes a steering angle of the propulsion device; and
      generate a steering actuator position command for the steering actuator based on the steering angle command and the sensed trim actuator position.

2. The system of claim 1, wherein the at least one processor is further configured to cause the steering actuator to extend or retract based on the steering actuator position command.

3. The system of claim 1, wherein the at least one processor is configured to generate the steering actuator position command by:
   identifying, based on the sensed trim actuator position, a mapping encoding a determined relationship between steering angle commands and corresponding steering actuator position commands; and
   using the identified mapping to generate the steering actuator position command from the steering angle command.

4. The system of claim 1, further comprising:
   a memory storing a plurality of mappings corresponding to a respective plurality of trim positions, each of the plurality of mappings encoding a determined relationship between steering angle commands and corresponding steering actuator position commands,
   wherein the at least one processor is configured to generate the steering actuator position command by:
      identifying, based on the sensed trim actuator position, a mapping in the plurality of mappings; and
      using the identified mapping to generate the steering actuator position command from the steering angle command.

5. The system of claim 1, wherein the at least one processor is configured to generate the steering actuator position command by calculating the steering actuator position command based on the steering angle command and the trim actuator position.

6. The system of claim 1, wherein the steering actuator is attached to a transom of the marine vessel at a different height and/or fore-aft position from a trimming pivot point of the propulsion device.

7. A method for use in a marine vessel, the marine vessel having a steering actuator coupled to a propulsion device and a trim actuator coupled to the propulsion device, the trim actuator having a trim actuator position, the method comprising:
   receiving a steering angle command for the propulsion device;

receiving a sensed trim actuator position from a trim position sensor, wherein movement of the trim actuator position while maintaining a constant steering actuator position changes a steering angle of the propulsion device; and generating a steering actuator position command for the steering actuator based on the steering angle command and the sensed trim actuator position.

8. The method of claim 7, further comprising:

causing the steering actuator to extend or retract based on the steering actuator position command.

9. The method of claim 7, wherein the generating comprises:

identifying, based on the trim actuator position, a mapping encoding a determined relationship between steering angle commands and corresponding steering actuator position commands; and using the identified mapping to generate the steering actuator position command from the steering angle command.

10. The method of claim 7, wherein the generating comprises:

calculating the steering actuator position command based on the steering angle command and the trim actuator position.

* * * * *